(12) United States Patent
Sittig et al.

(10) Patent No.: US 11,108,836 B2
(45) Date of Patent: Aug. 31, 2021

(54) SYSTEM AND METHODS OF DE-CENTRALIZED CONTENT COLLECTION, DISTRIBUTION, AND CONTROL

(71) Applicant: Relola Inc., Mountain View, CA (US)

(72) Inventors: Heather L. Sittig, Oakland, CA (US); Graham Golder, Berkeley, CA (US); Martin Morzynski, San Francisco, CA (US)

(73) Assignee: Relola, Inc., Mountain View, CA (US)

( * ) Notice: Subject to any disclaimer, the term of this patent is extended or adjusted under 35 U.S.C. 154(b) by 0 days.

(21) Appl. No.: 17/071,867

(22) Filed: Oct. 15, 2020

(65) Prior Publication Data

US 2021/0112105 A1 Apr. 15, 2021

Related U.S. Application Data

(60) Provisional application No. 62/915,503, filed on Oct. 15, 2019.

(51) Int. Cl.
| | |
|---|---|
| *G06F 21/62* | (2013.01) |
| *H04L 29/06* | (2006.01) |
| *G01S 19/51* | (2010.01) |
| *H04L 29/08* | (2006.01) |

(52) U.S. Cl.
CPC .......... *H04L 65/4076* (2013.01); *G01S 19/51* (2013.01); *H04L 67/18* (2013.01); *H04L 67/20* (2013.01); *H04L 2209/60* (2013.01)

(58) Field of Classification Search
CPC . H04L 2209/60; H04L 65/4076; H04L 67/18; H04L 67/20; G01S 19/51; G06Q 30/0251; G06Q 50/10; G06Q 30/0277; G06F 21/16; H04N 21/83
See application file for complete search history.

(56) References Cited

U.S. PATENT DOCUMENTS

| | | | |
|---|---|---|---|
| 7,930,347 B2 * | 4/2011 | Maxwell | G06Q 20/12 709/205 |
| 10,073,865 B2 * | 9/2018 | Wilder | G06Q 10/109 |
| 2008/0098212 A1 * | 4/2008 | Helms | H04N 21/8193 713/155 |

(Continued)

FOREIGN PATENT DOCUMENTS

WO WO-2015153373 A1 * 10/2015 ......... G06Q 30/0601

*Primary Examiner* — Oanh Duong
(74) *Attorney, Agent, or Firm* — Ahmann Kloke LLP

(57) ABSTRACT

A content distribution system configured to store first and second creator content generated respectively by first and second creators, receive first and second rules generated separately by the first and second creator, respectively, the first rules governing requirements for consumers to access the first content, the second rules governing requirements for consumers to access the second content, the first and second rules requiring that a potential consumer must be a member of the respective creator's group, the first rules further requiring that the potential consumer must pay to receive access to the first content, receive a content request from a first-third party system from a first consumer requesting access to the first content, confirm that the first user qualifies to receive access and that the first third-party system is permitted, and provide access to the first content.

23 Claims, 10 Drawing Sheets

(56) References Cited

U.S. PATENT DOCUMENTS

| | | | |
|---|---|---|---|
| 2010/0036967 A1* | 2/2010 | Caine | H04N 21/274 709/236 |
| 2012/0116897 A1* | 5/2012 | Klinger | G06Q 30/0277 705/14.73 |
| 2012/0167133 A1* | 6/2012 | Carroll | G06Q 30/0251 725/32 |
| 2013/0246179 A1* | 9/2013 | Shrock | G06Q 30/0641 705/14.58 |
| 2014/0006931 A1* | 1/2014 | Pettitt | G06F 16/958 715/234 |
| 2015/0245108 A1* | 8/2015 | Pfeffer | H04N 21/26241 725/96 |
| 2016/0344831 A1* | 11/2016 | Schneider | H04L 67/10 |
| 2017/0063948 A1* | 3/2017 | Shroff | H04L 63/102 |
| 2018/0107746 A1 | 4/2018 | Jackson | |
| 2018/0293669 A1 | 10/2018 | Jackson | |
| 2019/0236115 A1* | 8/2019 | Takahashi | G06F 40/166 |
| 2019/0236214 A1* | 8/2019 | Kokernak | H04N 21/478 |
| 2019/0379748 A1* | 12/2019 | Gasnier | G06F 9/44526 |
| 2020/0044830 A1* | 2/2020 | Gargett | H04L 9/083 |

* cited by examiner

| Post ID | First Name | Last Name | Email | City | State | Date Collected | Domain |
|---|---|---|---|---|---|---|---|
| 1 | Diane | | xxxxx@xxxxx.xxx | New Haven | CT | 3/1/2019 | fanclub.com |
| 2 | Ivan | Chapman | xxxxx@xxxxx.xxx | New York | NY | 3/2/2019 | application |
| 3 | Amy | | xxxxx@xxxxx.xxx | Portland | OR | 4/5/2019 | music.com |
| 4 | Evert | Bobbert | xxxxx@xxxxx.xxx | Richmond | VA | 2/28/2019 | fanclub.com |
| 5 | Bob | Tennant | xxxxx@xxxxx.xxx | Seattle | WA | 3/14/2019 | application |
| 6 | Frank | Anderson | xxxxx@xxxxx.xxx | Pittsburg | PA | 4/1/2019 | fanclub.com |
| 7 | Cary | Tennant | xxxxx@xxxxx.xxx | Carlsbad | CA | 3/28/2019 | music.com |
| 8 | Ginger | Smith | xxxxx@xxxxx.xxx | Charlotte | NC | 3/16/2019 | fanclub.com |
| 9 | Henry | | xxxxx@xxxxx.xxx | Atlanta | GA | 2/25/2019 | music.com |

FIG. 8

SYSTEM AND METHODS OF DE-CENTRALIZED CONTENT COLLECTION, DISTRIBUTION, AND CONTROL

CROSS-REFERENCE TO RELATED APPLICATION(S)

The present application claims the benefit of U.S. Provisional Patent Application Ser. No. 62/915,503 filed Oct. 15, 2019 and entitled "Audio Enhanced Geo-Tagging," which is incorporated by reference herein.

FIELD OF THE INVENTION(S)

Embodiments discussed herein related generally to collecting, controlling, and distributing digital content from multiple digital content creators to digital content consumers.

SUMMARY

An example method comprises receiving, by a content distribution system, a first request to store first creator content generated by a first content creator of a plurality of content creators, the first request to store the first creator content including a first content creator identifier, and one or more first categorical identifiers associated with the first content creator content, storing by the content distribution system the first creator content within a data store, receiving by the content distribution system first rules by the first content creator that govern access to the first creator content, the first rules including a requirement that for any particular consumer to have access to the first creator content, that particular consumer must be a member of a first content creator group, must have paid a fee to be a member of the first content creator group, and be within a first particular geographic area, the first rules further allowing access to the first creator content to requests for content provided by a first subset of third-party systems if all the other first rules are met by the requester, the first subset of third-party systems be independent of and remote from each other, receiving by the content distribution system a second request to store second creator content generated by a second content creator of the plurality of content creators, the second request to store second first creator content including a second content creator identifier, and one or more second categorical identifiers associated with the second content creator content, storing by the content distribution system the second creator content within the data store, receiving by the content distribution system second rules by the second content creator that govern access to the second creator content, the second rules including a requirement that for any particular consumer to have access to the second creator content, that particular consumer must be a member of a second content creator group, and be within a second particular geographic area, the second rules not including a payment requirement, the second rules further allowing access to the second creator content to request for content provided by a second subset of third-party systems if all the other second rules are met by the requester, the second subset of third-party systems be independent of and remote from each other, the first subset of third-party systems and the second subset of third-party systems being different from each other, receiving by the content distribution system a first identifier from a first third-party system from a first user and a first request for first creator content from the first user, confirming by the content distribution system that the first third-party system is a member of the first subset of third-party systems, if the first third-party system is not a member of the first subset of third-party systems, sending, by the content distribution system, a denial of the first request, if the first third-party system is a member of the first subset of third-party systems, determining, by the content distribution system, from the first request if the first user meets requirements of the first rules including that the first user, based on the first identifier, is a member of the first content creator group, paid the fee to be a member of the first content creator group, and is within the first particular geographic area, if the first user meets the requirements of the first rules, providing, by the content distribution system, the first creator content requested by the first request to the first user through the first third-party system, receiving by the content distribution system a second identifier from a second third-party system from a second user and a second request for second creator content from the second user, confirming by the content distribution system that the second third-party system is a member of the second subset of third-party systems, if the second third-party system is not a member of the second subset of third-party systems, sending, by the content distribution system, a denial of the second request, if the second third-party system is a member of the second subset of third-party systems, determining, by the content distribution system, from the second request if the second user meets requirements of the second rules including that second first user, based on the second identifier, is a member of the second content creator group and is within the second particular geographic area, and if the second user meets the requirements of the first rules, providing, by the content distribution system, the second creator content requested by second request to the second user through the second third-party system.

In some embodiments, the first rules allowing access to the first creator content to requests for content provided by the first subset of third-party systems comprises the first rules allowing access to the first creator content to requests for content provided by a first domain, and wherein confirming by the content distribution system that the first third-party system is a member of the first subset of third-party systems comprises confirming that the first third-party system is a member of the first domain and if the first third-party system is not a member of the first domain, sending, by the content distribution system to the first third-party system, a denial of the first request.

The first particular geographic area may be a country or a venue in some examples. The first rules may further require a time frame when the first user must provide the first request to obtain access for the first creator content. In some embodiments, the first rules further comprise a particular requirement that the first user must provide the first request from a particular venue during a particular time frame for access to a subset of first creator content, the subset of the first creator content otherwise not being available to other consumers that cannot meet the particular requirement.

In various embodiments, the method further comprises receiving by the content distribution system the second identifier from a third third-party system from the second user and a third request for first creator content from the second user, confirming by the content distribution system that the third third-party system is a member of the first subset of third-party systems, if the third third-party system is not a member of the first subset of third-party systems, sending, by the content distribution system, a denial of the third request, if the third third-party system is a member of the first subset of third-party systems, determining, by the content distribution system, from the third request if the second user meets requirements of the first rules including that the third user, based on the third identifier, is a member of the first content creator group, paid the fee to be a member of the first content creator group, and is within the first particular geographic area, and if the second user meets the requirements of the first rules, providing, by the content distribution system, the first creator content requested by third request to the second user through the third third-party system.

The method, in some embodiments, may comprise receiving by the content distribution system the second identifier from a third third-party system from the second user and a third request for general content from the second user, confirming by the content distribution system that the third third-party system is a member of the first subset of third-party systems and the second subset of third-party systems, determining that the second user meets the requirements of the second rules and not the first rules, and providing access to the second creator content.

The method may further comprise receiving by the content distribution system the second identifier from a third third-party system from the second user and a third request for general content from the second user, confirming by the content distribution system that the third third-party system is a member of the first subset of third-party systems and the second subset of third-party systems, determining that the second user meets the requirements of the second rules and the first rules, and providing access to the first creator content and the second creator content.

In some embodiments, determining if the first user is within the first particular geographic area comprises determining if the first third-party system is within the first particular geographic area, based, at least in part, on a first third-party system identifier.

In various embodiments, determining if the first user is within the first particular geographic area comprises determining if the first third-party system is within the first particular geographic area, based, at least in part, on GPS information from a digital device of the first user.

An example non-transitory computer readable medium may include executable instructions. The executable instructions may be executable by a processor for performing a method. The method may comprise receiving, by a content distribution system, a first request to store first creator content generated by a first content creator of a plurality of content creators, the first request to store the first creator content including a first content creator identifier, and one or more first categorical identifiers associated with the first content creator content, storing by the content distribution system the first creator content within a data store, receiving by the content distribution system first rules by the first content creator that govern access to the first creator content, the first rules including a requirement that for any particular consumer to have access to the first creator content, that particular consumer must be a member of a first content creator group, must have paid a fee to be a member of the first content creator group, and be within a first particular geographic area, the first rules further allowing access to the first creator content to requests for content provided by a first subset of third-party systems if all the other first rules are met by the requester, the first subset of third-party systems be independent of and remote from each other, receiving by the content distribution system a second request to store second creator content generated by a second content creator of the plurality of content creators, the second request to store second first creator content including a second content creator identifier, and one or more second categorical identifiers associated with the second content creator content, storing by the content distribution system the second creator content within the data store, receiving by the content distribution system second rules by the second content creator that govern access to the second creator content, the second rules including a requirement that for any particular consumer to have access to the second creator content, that particular consumer must be a member of a second content creator group, and be within a second particular geographic area, the second rules not including a payment requirement, the second rules further allowing access to the second creator content to request for content provided by a second subset of third-party systems if all the other second rules are met by the requester, the second subset of third-party systems be independent of and remote from each other, the first subset of third-party systems and the second subset of third-party systems being different from each other, receiving by the content distribution system a first identifier from a first third-party system from a first user and a first request for first creator content from the first user, confirming by the content distribution system that the first third-party system is a member of the first subset of third-party systems, if the first third-party system is not a member of the first subset of third-party systems, sending, by the content distribution system, a denial of the first request, if the first third-party system is a member of the first subset of third-party systems, determining, by the content distribution system, from the first request if the first user meets requirements of the first rules including that the first user, based on the first identifier, is a member of the first content creator group, paid the fee to be a member of the first content creator group, and is within the first particular geographic area, if the first user meets the requirements of the first rules, providing, by the content distribution system, the first creator content requested by the first request to the first user through the first third-party system, receiving by the content distribution system a second identifier from a second third-party system from a second user and a second request for second creator content from the second user, confirming by the content distribution system that the second third-party system is a member of the second subset of third-party systems, if the second third-party system is not a member of the second subset of third-party systems, sending, by the content distribution system, a denial of the second request, if the second third-party system is a member of the second subset of third-party systems, determining, by the content distribution system, from the second request if the second user meets requirements of the second rules including that second first user, based on the second identifier, is a member of the second content creator group and is within the second particular geographic area, and if the second user meets the requirements of the first rules, providing, by the content distribution system, the second creator content requested by second request to the second user through the second third-party system.

An example system may comprise at least on processor and memory. The memory may including instructions to configure the at least on processor to receive a first request to store first creator content generated by a first content creator of a plurality of content creators, the first request to store the first creator content including a first content creator identifier, and one or more first categorical identifiers associated with the first content creator content, store the first creator content within a data store, receive first rules by the first content creator that govern access to the first creator content, the first rules including a requirement that for any particular consumer to have access to the first creator content, that particular consumer must be a member of a first content creator group, must have paid a fee to be a member of the first content creator group, and be within a first particular geographic area, the first rules further allowing access to the first creator content to requests for content provided by a first subset of third-party systems if all the other first rules are met by the requester, the first subset of third-party systems be independent of and remote from each other, receive a second request to store second creator content generated by a second content creator of the plurality of content creators, the second request to store second first creator content including a second content creator identifier, and one or more second categorical identifiers associated with the second content creator content, store the second creator content within the data store, receive second rules by the second content creator that govern access to the second creator content, the second rules including a requirement that for any particular consumer to have access to the second creator content, that particular consumer must be a member of a second content creator group, and be within a second particular geographic area, the second rules not including a payment requirement, the second rules further allowing access to the second creator content to request for content provided by a second subset of third-party systems if all the other second rules are met by the requester, the second subset of third-party systems be independent of and remote from each other, the first subset of third-party systems and the second subset of third-party systems being different from each other, receive a first identifier from a first third-party system from a first user and a first request for first creator content from the first user, confirm that the first third-party system is a member of the first subset of third-party systems, if the first third-party system is not a member of the first subset of third-party systems, send a denial of the first request, if the first third-party system is a member of the first subset of third-party systems, determine from the first request if the first user meets requirements of the first rules including that the first user, based on the first identifier, is a member of the first content creator group, paid the fee to be a member of the first content creator group, and is within the first particular geographic area, if the first user meets the requirements of the first rules, provide the first creator content requested by the first request to the first user through the first third-party system, receive a second identifier from a second third-party system from a second user and a second request for second creator content from the second user, confirm that the second third-party system is a member of the second subset of third-party systems, if the second third-party system is not a member of the second subset of third-party systems, send a denial of the second request, if the second third-party system is a member of the second subset of third-party systems, determine from the second request if the second user meets requirements of the second rules including that second first user, based on the second identifier, is a member of the second content creator group and is within the second particular geographic area, and if the second user meets the requirements of the first rules, provide, the second creator content requested by second request to the second user through the second third-party system.

BRIEF DESCRIPTION OF THE DRAWINGS

FIG. 8 depicts an example of a content consumer reporting provided by the content distribution system according to some embodiments.

DETAILED DESCRIPTION

Figure 1:
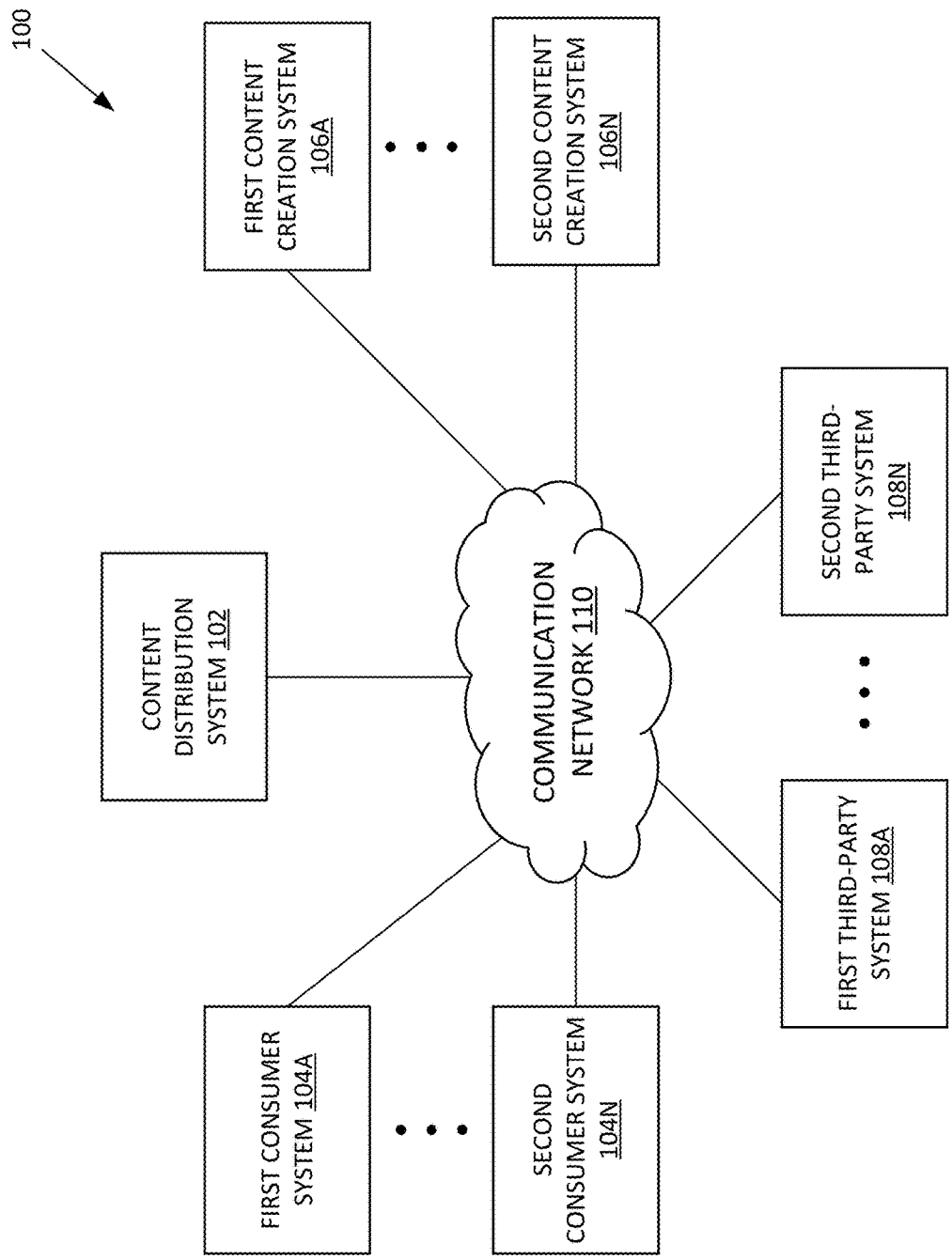
FIG. 1 depicts a block diagram of an example environment capable of collecting, controlling, and distributing digital content over any number of networks.

Content creators work hard to create digital content. For example, content creators may create digital content such as digital music, digital images, digital videos, virtual reality, and augmented reality. To increase the viewership of the created digital content and reach more consumers, content creators may upload their content onto many different websites and content consumer domains. An issue associated with uploading content to many different websites and content consumer domains is that each of these websites and domains controls access of the visiting consumer (e.g., the website or domain may control access of the consumer to the content and/or the content creator). Furthermore, different websites and different domains may choose to present advertisements from third-party brands to content consumers without reimbursing the content creators who brought consumers to the websites and domains.

For example, musicians may choose to upload a music video or music of their latest track onto websites and content consumer domains such as YouTube.com, Facebook.com, Apple iTunes, and Google Play Store. These websites and domains may require content consumers or users to register with the website or domain before they can access the music in various formats. These websites may capitalize on musicians and users who viewed or listened to music. For example, Facebook may present advertisements from a third-party to users who viewed or listened to the music from the music artist without having to reimburse the music artist. In another example, YouTube may charge musicians a fee for information regarding users who accessed or viewed their videos, such as the number of unique viewers per hour over a period of time, or demographics of the users who accessed or viewed their videos.

In various embodiments, a content distribution system collects digital content from multiple content creators and controls/distributes the digital content to content consumers. Different content creators may encrypt and store digital content on the content distribution system. The content distribution system may distribute the digital content according to the distribution properties provided by the content creator. Distribution properties may include specifying the groups of content consumers that have access to a particular digital content, when the particular digital content will be made available, and for how long. In various embodiments, the content creator determines that only users who have a premium membership to a creator's fan club may access the particular digital content (e.g., the content creator may require that different websites confirm that the consumer is a member of the creator's fan club). In various embodiments, the content creator determines a particular video may only be accessible when users are in a particular geographic location at a particular time (e.g., the rules enforcing the ability to access the creator's content may be enforced regardless of where the user navigated to consume the content).

In some embodiments, content creators may also be content consumers. The content creator may provide and specify digital content properties for different digital content to facilitate the search and further distribution of the digital content. The digital content properties may include the name of digital content, length of digital content, keywords, a geographic location associated with the digital content, and the name of the content creator associated with the digital content.

A user may make a request for digital content. The request may include, for example, the name of the content creator, date digital content was created, geographic location, and the like. The content distribution system may retrieve digital content based on the search request and provide the content back to the requesting web page for display as a part of the web page. In some examples, a user, registered and authenticated by the content distribution system, may send a request to the content distribution system to retrieve a particular digital content. In various embodiments, the content distribution system may only retrieve the particular content when the user is at a specific geographic location. In some embodiments, the content distribution system may only retrieve the particular content if the user sends the request at a specific time.

For each access of digital content from the content distribution system, the content distribution system may create a distribution entry for the digital content. The distribution entry for may include information from the user who accessed the digital content such as name, demographics data, the location, a duration of time the content is consumed, and the number of times the user has consumed the first digital content. In some embodiments, distribution entry includes names of one or more third-party systems that may have access to the distribution entry. Distribution entries may be stored in the content distribution system and may only be accessed by the content creator who uploaded the digital content associated with the distribution entry. In various embodiments, the content creator may give permission to other content creators or third-party systems to access to some or all of their distribution entries.

In some embodiments, a user may associate a review with the digital content accessed from the content distribution system. One article or item of digital content may be associated with multiple reviews. However, one review may be associated with one digital content. In some embodiments, reviews may be categorized based on a type of subscription of the content consumer. In some embodiments, the content distribution system may have different types of subscriptions available to the content consumer for all content creators of the content distribution system.

The content distribution system may require content consumers to subscribe to different types of subscriptions for a particular content creator. In some embodiments, the content distribution system may only allow content consumers who subscribe to a premium subscription for a particular content creator to have access to premium digital content. For example, a review of a digital content submitted by a content consumer with a premium subscription may be given higher priority than another review of the same digital content submitted by another content consumer with a regular subscription. In some examples, a review may be in the form of text, audio, digital image, digital video, or some combination thereof. In various embodiments, reviews may be in the form a "thumbs up" or a "thumbs down" to represent a like or dislike of the digital content. In some embodiments, reviews may be in the form of one or more hearts.

In some embodiments, the content distribution system may retrieve a profile page of a user of the content distribution system. The user of the content distribution system may be a content creator or content consumer. The profile page may include contact information for the user, any number of links to other content creators, and/or content consumers who are socially connected to the particular content creator or content consumer.

A content consumer report may be generated periodically or on-demand. In some embodiments, the content consumer report may be generated hourly, daily, weekly, or monthly. The content consumer report may be generated in real-time, reflecting information accurately at or near the moment of creation. The content consumer report may be generated to reflect content consumption data of one or more digital content from the same content creator. In some embodiments, the content consumer report may be generated to reflect a change in the number of unique users who accessed digital content created by the content creator over a period of time. In various embodiments, the content consumer report may be generated to output the number of users subscribed to one or more user groups administered by a particular content creator.

In some embodiments, the content distribution system may generate a content consumer report from more than one content creator. In one embodiment, the content consumer report may be generated when one or more consumer content reaches a particular number of content consumer report entries. For example, a content consumer report may be generated when a particular digital content reaches one million requests from users of the content distribution system. In various embodiments, the content distribution system may generate a content consumer report for digital content consumed in a particular geographic area during a particular time frame. For example, the content distribution system may generate a content consumer report by users attending a music festival to determine the most popular songs or artists requested by the users attending the music festival.

In some embodiments, the content distribution system may generate a navigational report that tracks a navigational path between a particular digital content to subsequent digital content. Any of the above-referenced reports may be reported in real-time. A content creator may generate one of the above-referenced content consumer reports and may be given a choice to view real-time changes in the consumption of digital content of interest to the content creator.

In some embodiments, a website provides or otherwise generates a web page with a section of embedded code. The embedded code, initially provided by a content distribution system, may generate a section (e.g., a portion) of the web page. The section of the web page may be integrated into the web page such that the entire web page, including content from the generated section, appears to be from the same source. The embedded code, however, may provide a request for digital content from the content distribution system while the rest of the content of the web page is provided by an owner or operator of the web page.

In various embodiments, the digital content displayed in a user interface may appear to be a part of the web page, web site, or application (e.g., from the owner or operator of the web page, web site, or application). It will be appreciated that the content distribution system may enable the delivery of digital content such that it appears to be coming from the web page, web site, or application, thereby keeping customers and/or viewers of the user interface to be engaged with the original domain (e.g., the web page, web site, or application).

Different websites and/or different applications may retrieve and store digital content to a centralized system that collects, stores, and distributes digital content based on the criteria of the request (e.g., the user making the request, timeline, location, and/or other information). As a result, a centralized system, such as a content distribution system, may provide content to multiple different web pages and applications. The different web pages and applications may present digital content from the content distribution system as if the digital content was being provided by the entity that owns or operates the web pages or applications.

Further, it will be appreciated that the content distribution system may receive digital content from different content creators. The digital content from different content creators may be provided to a group of different web pages, web sites, and/or applications. As a result, digital content generated from one or more content creators may be leveraged by different sites. In some embodiments, a content creator may enable their digital content to be stored in the content distribution system. In one embodiment, the content creator may make selections to enable their digital content to be provided to a group or subset of web pages, web sites, and/or applications such that their digital content appears to be a part of the web page, web site, or application (e.g., from the owner or operator of the web page, web site, or application). In various embodiments, the user is a content consumer, a content creator, or both. Each of the digital content may provide a link to the content creator who created or submitted the respective digital content.

It will be appreciated the digital content may include any type of digital media, including, but not limited to, pictures, text, video, sound, graphics, icons, interactive programming, or any combination of the above.

FIG. 1 depicts a block diagram of an example environment 100 capable of collecting and providing digital content and reviews associated with digital content. In this example, the environment 100 includes a first consumer system 104A, a second consumer system 104N (individually, the consumer system 104 collectively), a communication network 110, a content distribution system 102, a first content creation system 106A, a second content creation system 106N (individually, the content creation system 106 collectively), a first third-party system 108A, and a second third-party system 108N (individually, the third-party system 108 collectively). The first and second consumer systems 104A and 104N, the first and second content creation systems 106A and 106N, and the first and second third-party systems 108A and 108N may each be or include any number of digital devices. A digital device is any device with a processor and memory. Digital devices are further discussed herein (e.g., see FIG. 10).

In some embodiments, the first and second consumer systems 104A and 104N may facilitate communication between users and other associated systems. In some embodiments, one or both of the first and second consumer systems 104A and 104N may be or include one or more mobile devices (e.g., smartphones, cell phones, smartwatches, tablet computer, or the like), desktop computers, laptop computers, and/or the like.

In some embodiments, the communication network 110 represents one or more computer networks (e.g., LANs, WANs, and/or the like). The communication network 110 may provide communication between any of the first and second consumer systems 104A and 104N, the first and second content creation systems 106A and 106N, and the first and second third-party systems 114 and 116. In some implementations, the communication network 110 comprises computer devices, routers, cables, uses, and/or other network topologies. In some embodiments, the communication network 110 may be wired and/or wireless. In various embodiments, the communication network 110 may comprise the Internet, one or more networks that may be public, private, IP-based, non-IP based, and so forth.

In some embodiments, users may interact with any one of the first consumer system 104A, the second consumer system 104N, the first content creation system 106A, and the second content creation system 106N. For example, a web browser or mobile application to communicate with other users, access web pages, and/or interact with applications on their own devices to generate or receive digital content from the content distribution system 102.

In some embodiments, the content distribution system 102 provides a system to allow a user to register and authenticate the user's login and password. During the registration process, the user may provide their contact information to the content distribution system 102. After the user has been registered and authenticated, the content distribution system 102 outputs to a user interface different types of subscriptions available to the user. The different types of subscriptions may include a premium (fee-based) subscription or a regular (free) subscription. In various embodiments, other types of subscriptions may be available. The content distribution system 102 may output a questionnaire to determine user groups or content creators, which may be of interest to the user. The user of the first consumer system 104A or the second consumer system 104N may create an account on the content distribution system 102. The user In some embodiments, the content distribution system 102 provides a search interface to receive input from the user (e.g., either from the user navigating with a web browser to one or more websites or using an application). In response to the user interacting with the search interface, the content distribution system 102 receives a request to create a search query based on one or more search criteria. The result of the search query is a search result that may be based, at least in part, on information provided in the search request. The user may interact (e.g., click) with one or more elements in the search results. The search interface may allow the user to search for digital content, reviews associated with digital content, content creators, or content consumers.

For example, the search results may include multiple digital contents that fit the user's search criteria. By selecting one or more of the multiple digital contents of the search results, more detailed information regarding a particular digital content may be depicted. For example, a user may create a search query to search for the latest songs from Pitbull. The content distribution system 102 may receive the search query and provide, within a user interface, related digital content (e.g., audio and/or video from the artist Pitbull).

In some embodiments, the content distribution system 102 allows the user to sort search results by several search criteria. Search criteria may include, for example, the name or the date of publication of the digital content, a percentage of the relevancy of the digital content to the user's search query, and the popularity of the digital content. The popularity of the digital content stored on the content distribution system 102 may be based on the number of times the digital content was previously accessed by other users of the content distribution system 102. The user may interact with (e.g., select) one of the multiple digital contents in the search results to find out more detailed information about it, such as the name of the album the song is from, information about the song such as the source of inspiration for the song, reviews of the song provided by other users of the content distribution system 102, and the current ranking of the song on various track ranking charts.

In various embodiments, the search results may include a list of information identifying content creators that fit the user's search criteria. By selecting one or more of the search results, the content distribution system 102 may provide a profile page of a particular content creator. The user may interact with the profile page of the particular content creator to obtain more information about the most recent digital content created by the particular content creator, upcoming events hosted by the particular content creator, and the like.

In some embodiments, the profile page includes ways of getting in contact with the particular content creator. The user may request a social connection with the particular content creator and view profile pages of other users (e.g., content creators or content consumers) who are socially connected with the particular content creator. Once a content creator is added to a user's social network, the content distribution system 102 may provide notification to the content creator of a new social connection. In some embodiments, the user is a content consumer, or a content creator, or both.

In some embodiments, the content distribution system 102 filters and organizes digital content and their associated reviews according to one or more filter criteria, including review properties, which may include tags, the time stamp of the review, user identification of the person who left the review, type of review, and/or others. In some embodiments, reviews may be categorized based on the type of subscription of the content consumer leaving the review. For example, the content distribution system may have different types of subscriptions associated with one or more content creators of the content distribution system. Other filtering criteria could include but are not limited to, the digital content properties such as name of digital content, geographic location associated with the digital content, the time digital was loaded into the content distribution system, and/or keywords.

Figure 7:
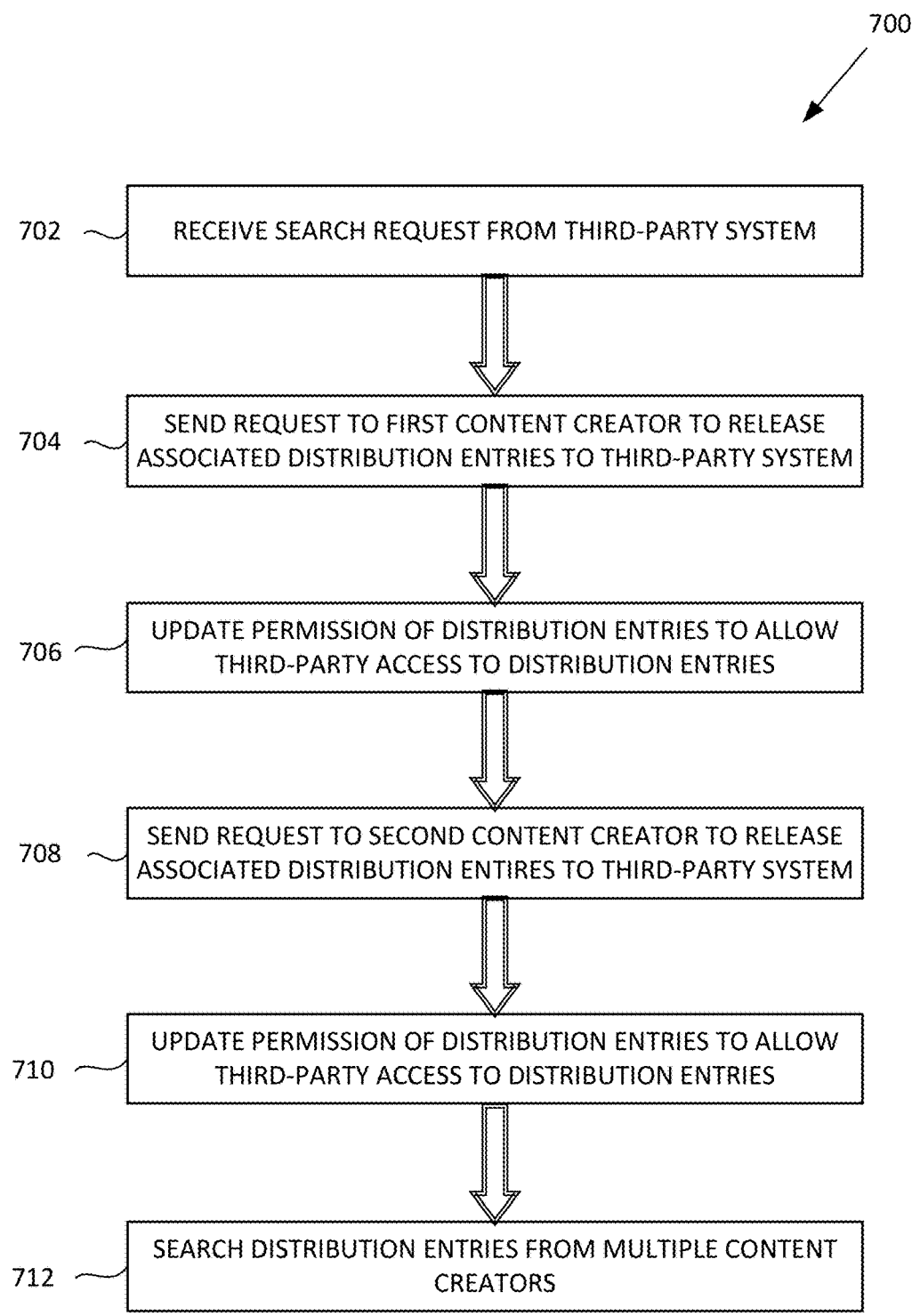
FIG. 7 depicts a flow chart of identifying distribution entries which are accessible to a third-party system according to some embodiments.
Figure 9:
FIG. 9 depicts an example of a map showing real-time locations of consumer consumption from a particular content creator according to some embodiments.

In various embodiments, the content distribution system may display the output of the search query in the form of a map, such as a content consumer report 800 of FIG. 7, a map 900 of FIG. 9, and/or other electronic forms. The user may interact with one or more elements in the search results, and the embedded code of the web page may provide a digital content and/or a review associated with the digital content, including digital content properties and/or review properties.

The user may provide a review of a digital content. Multiple reviews may be associated with the same digital content. In some embodiments, each review is associated with one digital content. In some embodiments, the content consumer may provide a review of a content creator. The content distribution system 102 may receive, from a content consumer, a request to store a review of the digital content. The content distribution system 102 may store the review of the digital content into a digital content datastore. Once the review is stored in the digital content datastore, the content distribution system 102 may provide notification of a new review to the content creator of the digital content associated with the new review. The review of the digital content may be linked or associated with the user (e.g., a user ID), time at which the review was uploaded to the content distribution system 102 (e.g., by timestamp), location information (e.g., map locations or coordinates), and/or the like.

In one embodiment, users of the content distribution system 102 may reply or interact with reviews left by other users. For example, a user may provide a review of digital content created by a content creator; another user may respond to the review. The other user may provide another review of the digital content. The content creator may respond to the reviews to provide social interaction between content creators and content consumers. In some embodiments, the content distribution system 102 may notify the user of the response to the review. In various embodiments, the content distribution system 102 notifies the content creator of each review or response to a review of digital content associated with the content creator. A notification of a new review or response to a review may be done in real-time or substantially in real-time. In some embodiments, the content creator may request that the notification be summarized or in a notification report (e.g., either or both may be provided by the content distribution system 102) that is sent to the content creator or a representative of the content creator periodically, such that new reviews or responses to a previously submitted review are sent to the content creator every week. The notification may be in the form of an email or a text message.

In some embodiments, the review may be in the form of a "thumbs up" or a "thumbs down" to represent a like or dislike of the digital content. For example, if the content consumer gives a particular digital content a "thumbs down," the content distribution system 102 may skip the remaining digital content and add the particular digital content onto a list of digital content to avoid loading in the future. Furthermore, the content distribution system 102 may use artificial intelligence or a learning algorithm to predict digital content that the user may enjoy listening to based on the historical "thumbs up" or "thumbs down" of previously loaded digital content or answers to the questionnaire provided by the content distribution system 102 during the registration process. The content distribution system 102 may utilize properties of the digital content, such as artists, the genre of the digital content, rhythm, beat, etc., to predict subsequent digital content to present to the user.

The content distribution system 102 may generate a report that tracks or identifies a navigational path between a particular digital content to subsequent digital content. For example, a user may navigate from the particular digital content from a profile page of content creator A to a profile page of content creator B (which is part of the social network of the content creator A) and then to a profile page of content creator C (which is part of the social network of the content creator B). The content distribution system may generate a navigational report documenting the path from content creator A to content creator B and then to content creator C. The navigational report may include navigational statistics over a period of time; these navigational statistics may be useful for content creators to determine content creator connections, which provided the most number of visits from users, or which of the content creators in the particular content creator's social network are most popular.

The content distribution system 102 may include digital content from any number of content creators, including, but not limited to, the first content creation system 106A and the second content creation system 106N. The content distribution system 102 may receive a request from the first content creation system 106A to upload digital content to the content distribution system 102. The content distribution system 102 may encrypt the digital content before storing the encrypted digital content. The encryption of the digital content ensures that digital content can only be played when accessed by users of the content distribution system 102. Any number of websites or applications may request information from the content distribution system 102 and, based on the criteria (e.g., the domain of the website), the content distribution system 102 may select and/or filter any amount of previously-stored digital content and provide the digital content back to the requesting website or application.

The content distribution system 102 may include reviews for any of the digital content stored in the content distribution system 102 from any number of users. Any number of websites or applications may request reviews associated with digital content from the content distribution system 102. Based on the criteria (e.g., the domain of the website), the content distribution system 102 may select and/or filter any amount of previously-stored reviews associated with one or more digital content and provide the digital content back to the requesting website or application.

A content consumer report may be generated by the content distribution system 102 periodically and/or on-demand. The content consumer report may be generated to reflect content consumption data of one or more digital content from the same content creator. In some embodiments, the content distribution system may generate a content consumer report from more than one content creator. The content consumer report may be generated hourly, daily, weekly, or monthly. In one embodiment, the content consumer report may be generated when one or more consumer content reaches a particular number of content consumer report entries. For example, a content consumer report may be generated when a particular digital content reaches one million requests from users of the content distribution system. In various embodiments, the content distribution system may generate a content consumer report for digital content consumed in a particular geographic area during a particular time frame.

The content distribution system 102 may receive a request, from the content creator or a representative of the content creator, for the content consumer report from the content creator. The content distribution system 102 may provide the content creator access to information regarding content consumers. The request may include content consumer report properties, including a time range of digital content or review associated with a particular digital content uploaded to the content distribution system 102, and/or the number of times the particular digital content has been accessed by users of the content distribution system 102. For example, the content creator may utilize this information to determine how popular their digital content is, a geographic location of content consumers who accessed digital content created by the content creator, the demographics of content consumers, and the like. The content distribution system 102 may send the content consumer report to the content creator in the form of a spreadsheet, a chart, a graph, a map, such as a map 900 of FIG. 9, and the like. In some embodiments, the content distribution system 102 may output the content consumer report in a user interface, an email, or in a software application accessible on a web site or a mobile device.

The content distribution system 102 may receive a request for a content consumer report of consumed digital content created by multiple content creators of the content distribution system 102. The request may include content consumer report properties, including a time range of digital content or review associated with a particular digital content uploaded to the content distribution system 102, and/or a number of times the particular digital content has been accessed by users of the content distribution system 102. The request may be received from the first third-party system 108A or the second third-party system 108N. For example, the first third-party system 108A may send a request to the content distribution system 102 for at least a portion of the content consumer report of consumed digital content, the consumed digital content created by a first content creator, and/or a second content creator. In some embodiments, the content distribution system 102 may request permission from the first content creator of the first content creation system 106A and the second content creator of the second content creation system 106N before the first third-party system 108A may search a portion of the content consumer report of digital content created by the content creators. The first third-party system 108A, may use the content consumer report to determine a specific digital content or a particular content creator that is most popular with a certain age group. In various embodiments, the content consumer report identifies the most popular hashtag or keyword from one or more content creators over a period of time.

The first third-party system 108A and the second third-party system 108N may represent a product or brand that is not related to the multiple content creators of the first consumer system 104A and the second consumer system 104N. For example, the first third-party system 108A, represents a brand of alcohol or a marketing team looking for a spokesperson for the latest sneaker. The first third-party system 108A may send a request to the content distribution system 102 for a content consumer report requesting a report for the content creator of the content distribution system 102, which is most popular with people between the ages of 21 to 30.

Figure 2:
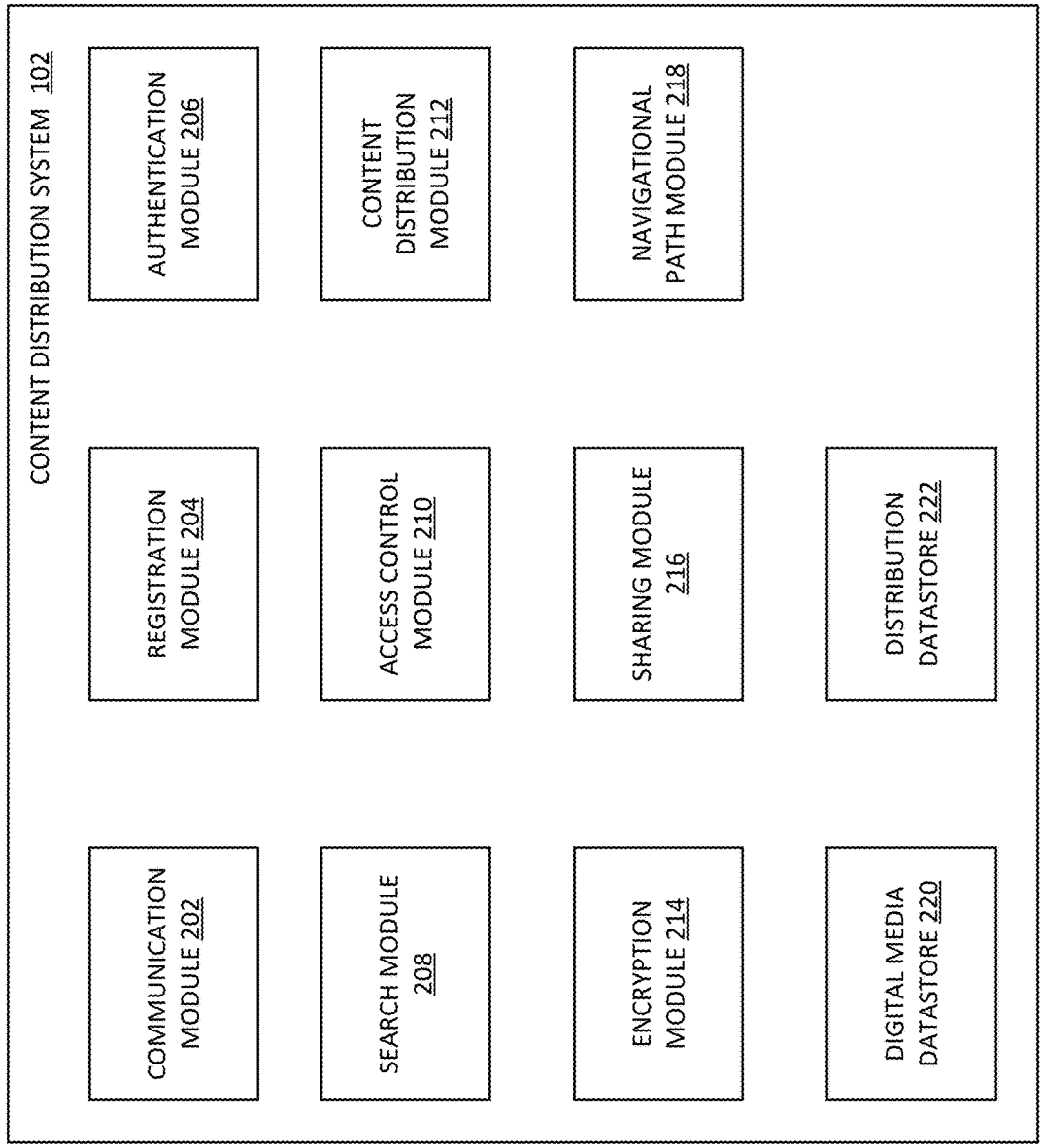
FIG. 2 depicts a block diagram of an example content distribution system according to some embodiments.

FIG. 2 depicts a block diagram of an example content distribution system 102 according to some embodiments. The content distribution system 102 includes a communication module 202, a registration module 204, an authentication module 206, a search module 208, an access control module 210, a content distribution module 212, an encryption module 214, a sharing module 216, a navigational path module 218, a digital content datastore 220, and a distribution datastore 222.

In some embodiments, the communication module 202 sends and receives data and requests between any one of the modules or datastore of the content distribution system 102 to another of the modules or datastore of the content distribution system 102. In one embodiment, the communication module 202 sends and receive data and request between any of the modules or datastore of the content distribution system 102 and any of the systems of the environment 100 of FIG. 1.

In some embodiments, the registration module 204 may be configured to create accounts for users. The registration module 204 may be configured to update account information for users and users. When a new user registers, a user identifier (e.g., a login identifier) and password may be required. In some embodiments, users may be content consumers, or content creators, or both. In various embodiments, users may represent third-party systems such as the first third-party system 108A.

In various embodiments, the registration module 204 register accounts for users may include user identification information. Users may be content consumers and/or content creators. User identification for both content consumers and content creators may include an email address, password, and phone number. Content consumers may have user identification information that is different from content creators. For example, user identification information for a content consumer may include, for example, demographic information, content creators that the user has subscribed to, type of subscription the user has subscribed to. The demographic information may include age, sex, residential zip code, marital status, and/or household income. User identification information for content creators may include a preferred method of notification (e.g., preferred by a content creator), a number of user groups associated with the content creator, types of subscriptions available, and which user group(s) are associated with the different types of subscriptions.

In some embodiments, a user who is a content consumer may be required to register to access the digital content stored in the content distribution system 102 or to create a review associated with the digital content stored in the content distribution system 102. In various embodiments, a user who is a content creator is required to register in order to encrypt, store, and/or upload digital content into the content distribution system 102. In some embodiments, a registered content creator can only access reviews associated with their digital content (e.g., the digital content created by the registered content creator). In various embodiments, a registered content creator can only access a content consumer report, which includes distribution entries associated with digital content uploaded by the registered content creator.

In some embodiments, the user represents the first third-party system 108A or the second third-party system 108N. The registration module 204 may require the user to register to request a content consumer report.

In some embodiments, the authentication module 206 authenticates a user's login and password. The login and password may be associated with the user's account. The authentication module 206 may authenticate a user by comparing the user's login and password with a database of registered users. It will be appreciated that users may be authenticated in many ways, including, but not limited to, device identifiers, biometrics, encryption keys, cookies, and/or the like.

In some embodiments, the search module 208 receives a request to search for digital content, a review of digital content, or a content creator. The search module 208 may create a search query based on one or more search criteria. The result of the search query is a search result that may be based, at least in part, on information provided in the search query. The search module 208 filter and organize the search results according to one or more filter criteria, including the digital content properties. The digital content properties may include content, length of digital content, keywords, a geographic location associated with the digital content, and the name of the content creator associated with the digital content. The search module 208 may output the results of the search query in the form of a map, a list, or in some other electronic forms. The user may interact with one or more elements in the search results; the search module may send a request to the access control module 210.

In some embodiments, the access control module 210 determines whether or not a user can access a requested digital content based on at least one distribution property. Distribution properties may include, for example, the user groups that have access to a particular digital content when the particular digital content will be made available and for how long. In some embodiments, the access control module 210 requires that only users in a particular geographic location during a particular time frame may access the requested digital content (e.g., those users present at a venue during a concert associated with the creator of the digital content).

The access control module 210 includes multiple rules provided by each content creator. Each content creator's rules may govern various aspects of access and distribution for that content creator's content. The rules may include consumer rules, access rules, tracking rules, and content rules. Consumer rules manage requirements that have to be satisfied before a user may access digital content. Access rules determine where a request for digital content or distribution entries associated with digital content comes from and include notification requirements. Tracking rules log information of interest or importance to a content creator. Content rules govern which digital content is accessible or not, and by whom.

In some embodiments, consumer rules may govern requirements that have to be satisfied before users access digital content. For example, before accessing any digital content, a user may be required to provide a valid or registered login and password. In some embodiments, a content creator may need users to have a membership before accessing one or more digital content from the content creator. In some embodiments, consumer rules may require the user to pay a premium before making the user's digital content accessible. Some consumer rules may require the user to be at particular geographic locations or vicinity to the specific geographic location to access specific digital content. For example, the content creator may send a notification of a concert at a venue, content consumers interested in a preview of the concert, or accessing behind-the-scenes video of the concert may only be able to access this if the content distribution system determines that the user is currently within 100 meters of the venue. Other consumer rules may only make certain digital content accessible at a particular time frame or only after a specific time and date. For example, Pitbull's latest song may only be accessed by users of the content distribution system after the song has dropped. In some embodiments, content creators may only make certain digital content available to "super fans" or users who have accessed or consumed a predetermined number of digital content by the same content creator, or users with a particular type of membership.

Access rules may determine where a request for digital content or distribution entries associated with digital content comes from. For example, a content creator may specify one or more third-party systems that may have access to some or all of the digital creator's distribution entries. Access rules may block other third-party systems from accessing distribution entries associated with the digital creator. In some embodiments, the content creator may block some users from some or all of the content creator's digital content. In various embodiments, the content creator may block some users from submitting a review associated with the content creator's digital content. For example, a children's music band may not wish to have their distribution entries accessible by a third-party system such as a company that provides vaping products.

Tracking rules include logs information of interest or importance to a content creator. For example, a content creator, such as Lady Gaga, may wish to know the number of unique users who accessed her latest song using the content distribution system every day since the song was released. The content creator may create a rule which requires that the content distribution system send a daily notification of the number of unique users who accessed her latest song in the past 24 hour period. In some embodiments, tracking rules may track or log when users who match particular requirements access digital content associated with the content creator. For example, a content creator may want to track, and be notified, of the number of users between the ages of 18-24 who live in the Atlanta area who accessed digital content associated with the content creator. Tracking rules may also include notification requirements, such as a notification frequency and the mode of notification of information associated with the tracking rule.

Content rules which govern which digital content is accessible or not, and by whom. For example, Pitbull's latest song includes explicit lyrics so that particular digital content may only be available to users who are 18 years or older. Suppose the content distribution system determines that the user trying to access Pitbull's latest song is younger than 18. In that case, the content distribution system may provide another version of the song without the explicit lyrics.

Other rules may govern the type of advertisements allowed around or within their digital content. For example, a children's music group may have rules which specify that advertisements associated with alcohol, medications, and vaping not be broadcasted or displayed in association with their digital content.

The geographic location of the user may be provided by third-party system, a Wi-Fi system associated with a particular area or venue, GPS coordinates provided by or through the user's digital device, cookies, internet service provider, or the like. In some embodiments, the venue may provide a code or other information to the user that the user may provide to the content distribution system 102 (e.g., within a request) to confirm their location or presence.

In various embodiments, the content creator determines that only users who have a premium membership may access the particular digital content. For example, if the access control module 210 determines that one user does not have the type of subscription that a digital content requires, the content distribution system 102 may provide a sample or a portion of the digital content. After providing the sample or the portion of the digital content, the content distribution system 102 may provide a notice and/or populate a user interface that notifies the user that a different type of subscription is required before the content distribution system 102 will continue outputting the first digital content. The content distribution system 102 may provide a subscription interface that allows the user to subscribe to the type of subscription required to allow the content distribution system 102 to continue outputting the digital content. If the access control module 210 determines that the user can access the requested digital content, the access control module 210 may send a request to the digital content datastore 220 to output the requested digital content to the user.

In some embodiments, the access control module 210 determines whether or not a user can access a user group created by a content creator. When the content creator encrypts and stores another digital content, the content creator may specify the user group(s) that can access the other digital content.

It will be appreciated that the content creator that defines the rules and requirement for access to the digital work. As a result, in some embodiments, it is the content creator, not the distributor or website that provides access to the digital work, that controls access, receives login requests, and/or tracks consumption in real time.

In response to the user receiving the requested digital content, the content distribution module 212 creates a distribution entry for the requested digital content. Each distribution entry may include distribution entry properties. In some embodiments, distribution entry property may include content consumer identification, content creator identification, domain identifier, duration of time the content consumer consumed the digital content, age, and other demographic information of the content consumer. The content distribution module 212 may create multiple distribution entries for the same digital content. In some embodiments, each distribution entry is associated with each access to digital content. In various embodiments, a distribution entry is associated with multiple digital contents. In one embodiment, one distribution entry is associated with particular digital content, with aggregated distribution entry properties. In some embodiments, aggregate distribution properties include a tally of demographic information of content consumers who accessed the particular content. The demographic information may include age, sex, residential zip code, marital status, and household income. The distribution entries created by the content distribution module 212 are stored in the distribution datastore 222.

In some embodiments, the content distribution module 212 generates a content consumer report. The content consumer report may be requested by a content creator or a representative of the third-party system. The content creator may send a request to the content distribution module 212 to generate the content consumer report. The content distribution module 212 searches distribution entries in the distribution datastore 222 to generate the requested content consumer report based on search criteria provided by the content creator or representative of the third-party system.

In one example, the content creator commands the content distribution module 212 to provide a report regarding those consumers that consume the content creator's digital work. The content creator may control access and dictate rules for consumption of their data. Further, access information (e.g., user identifiers, successful logins, unsuccessful logins, time of day of access, location of access, what digital media was consumed, when the digital music was consume, data analytics, demographics of those who consumed the digital media, and/or the like) may be stored by or for the content creator. The content creator may dictate rules and, in some embodiments, owns the access data, regardless of whether the access data is in the content creator's own digital device or is within a service such as the content distribution system 102 which may store digital content and assist to enable rules of any number of content creators.

In various embodiments, the content distribution system 102 may provide centralized control to a content creator. The content creator may create their content, store the content in the content distribution system 102, dictate rules regarding their created content (e.g., access, download, purchase, and the like), create or administer user accounts for access to their created content, and/or receive records of access including all information received by the content distribution system 102 in real time (e.g., at the time of login, logout, registration, access, download, third-party access, navigation, identifies of consumers that are consuming the creator's content, what is being consumed, what bandwidth the content is being consumed, and the like). Third party systems 108A may utilize widgets or otherwise enable consumers to access and consume the creator's content from the third-party systems 108A, however, the rules created or selected by the content creator controls access to the creator's media because content and access provided through the content distribution system 102.

The third-party system 108A may provide access for any number of consumers to consume media of any number of content creators through the content distribution system 102. Third-party systems, such as the first third-party system 108A, may send a request to the content distribution module 212 for a content consumer report requesting a report for content creators, which is most popular with people between the ages 18-25. A third-party system 108A may be, for example, a website or domain that is in communication with the content distribution system 102. There may be any number of third-party systems 108A that communicate with the content distribution system 102.

The requested content consumer report may comprise distribution entries from any number of different content creators. In some embodiments, each of the different content creators may need to give permission to the content distribution system 102 before their distribution entries are made available to the first third-party system 108A. In various embodiments, content creators may make their distribution entries open to the content distribution system 102. In response to the requested content consumer report, the first third-party system 108A may determine that the first content creator of the first content creation system 106A is an acceptable content creator for their purposes. The content distribution module 212 may send a request to the sharing module 216 to send a notification to the first content creation system 106A of the result of the content consumer report requested by the first third-party system 108A.

In some embodiments, the encryption module 214 encrypts digital content received from the content creators of the content creation system 106. Encryption of the digital content may ensure that the received digital content can only be output in the content distribution system 102 or from a website that included the embedded code from the content distribution system 102. When the content distribution system 102 receives a request from the first content creation system 106A to store the first digital content, the encryption module 214 generates an encryption key to encrypt the first digital content before it is stored in the digital content datastore 220. In some embodiments, a random number is used to generate the encryption key changes over time. In various embodiments, a Data Encryption Standard (DES) encryption is used. In one embodiment, an Advanced Encryption Standard (AES) encryption is used to encrypt the digital content.

In some embodiments, the sharing module 216 receives permission and enable content consumers or content creators to share the digital content or review associated with the digital content in an electronic mail (email) or social networking website such as Facebook®, Twitter®. In some embodiments, the sharing module 216 may receive a request from a content creator to share digital content that has recently been uploaded to the content distribution system 102. Upon the distribution properties of the digital content, the sharing module 216 may share the digital content with only specified content consumers of the content distribution system 102. In various embodiments, the content creator may share another digital content at a date/time that is specified by the content creator with specified content consumers of the content distribution system 102. Similarly, the sharing module 216 may receive a request from a particular content creator to share a review associated with digital content with other content consumers and/or content creators.

It will be appreciated that content consumers may generate reviews associated with digital content encrypted and stored in the digital content datastore 220. The content consumer (e.g., consumers of the creator's content or media) may invite other content consumers or groups of content consumers to access their reviews associated with the digital content using the sharing module 216. For example, the content consumer may provide user identifiers to invite others to receive or be able to view the content consumer's reviews. The sharing module 216 may retrieve user address information (e.g., email addresses, chat addresses, instant message addresses, or the like) from each content consumer's account. In some embodiments, the content consumer may provide address information and other contact information without the sharing module 216 retrieving the address information.

In some embodiments, the navigational path module 218 tracks the navigational path any given content consumer or content creator takes from a digital origin content to subsequent digital content. A content consumer or content creator can navigate to a digital origin content via a map or search query. For example, a content consumer can navigate map, interact with a location of the map which corresponds to a concert venue, the content consumer may select an audio clip from one content creator of an upcoming concert which will take place at the concert venue may be provided by the content distribution system 102. After the audio clip from the digital creator is over, the content distribution system 102 may provide audio or songs from the same content creator or a song from another content creator, which is in the same genre as the first content creator. The navigational path module 218 may track the path from the audio clip of the first content creator to songs from the second content creator. In other embodiments, navigational path module 224 may generate a navigational report documenting all or part of the navigational path and notify the first digital creator and the second digital creator. The report may include navigational statistics over a period of time and may be sent to the content creators involved periodically.

In some embodiments, the content creator may create rules that dictate that those users who purchase tickets to a particular concert at a particular venue can optionally register for an account with the content creator through the content distribution system 102. The rules may further dictate that those who navigate to the content distribution system 102 (e.g., directly or through a third-party service) may access and/or download the content creator's content during the concert if the user is at the venue. If the user is not at the venue or at the venue at a different time, the user (e.g., content consumer) may be denied access or rights to the content creator's content.

In some embodiments, the digital content datastore 220 may be any structure and/or structures suitable for storing digital content (e.g., an active database, a relational database, a self-referential database, a table, a matrix, an array, a flat file, a documented-oriented storage system, a non-relational No-SQL system, an FTS-management system such as Lucene/Solar, and/or the like). The digital content datastore 220 may store digital content created or retrieved from different domains, content creators, and/or the like. In some embodiments, digital content may be encrypted by the encryption module 214 before being stored in the distribution datastore 222.

In addition to digital content, digital content properties may also be stored in the digital content datastore 220 to facilitate the retrieval of the digital content. Digital content properties may include domain identifiers, name of digital content, a geographic location associated with the digital content, time digital was loaded into the content distribution system, and/or keywords.

Furthermore, reviews associated with digital content may be stored in the digital content datastore 220. Review properties may also be stored in the digital content datastore 220 to facilitate the retrieval of the reviews. Review properties may include tags, timestamps of the review, user identification of the person who left the review, type of review, and/or others. In some embodiments, reviews may be categorized based on the type of subscription of the content consumer leaving the review.

In various embodiments, the content creator may dictate rules that control who may be allowed to provide reviews associated with the content creator's content. For example, those that attended a concert during a particular time and at a particular venue may be enabled to provide a review of the concert and/or content associated with the content creator. Others may be denied the opportunity to provide a review. Alternately or additionally, reviews of those that attended a concert during a particular time and at a particular venue may be labeled or otherwise categorized as being "favorited," "premium," "fan," "superfan," or the like while others may be able to leave a review but without the preferred status.

It will be appreciated that a concert is only one example and the content creator can create rules governing consumption, reviews, etc. based on any kind of content, satisfied demographic, registration, fees (e.g., club fees), amount of content consumed, variety of content consumed, amount consumed over a particular period of time, and/or the like.

In some embodiments, the digital content datastore 220 may store the profile pages of content creators or content consumers who have been authenticated by authentication module 206. In various embodiments, the digital content datastore 220 may store the profile pages of all users of the content distribution system 102. In one example, the profile page of users of the content distribution system is stored in their respective domains.

In some embodiments, the distribution datastore 222 may be any structure and/or structures suitable for storing distribution entries or records (e.g., an active database, a relational database, a self-referential database, a table, a matrix, an array, a flat file, a documented-oriented storage system, a non-relational No-SQL system, an FTS-management system such as Lucene/Solar, and/or the like). The distribution datastore 222 may store distribution entries created or retrieved from different domains, user accounts, and/or the like.

The distribution entries which make up the content consumer report may include content consumer report properties. In some embodiments, distribution entry properties include the domain of the website, which includes the embedded code from the content distribution system 102. In various embodiments, distribution entry properties include content consumer identification, content creator identification, domain identifier, duration of time the content consumer consumed the digital content, and age and other demographic information of the content consumer. The content consumer report properties which are outputted may depend on the type of user requesting a content consumer report. For example, a particular content creator may be given full access to distribution entries regarding the particular content creator, such as demographic information, regarding any content consumer who accessed the digital content created by the particular content creator over a particular time frame. However, the particular content creator may not have permission to view distribution entries regarding other content creators of the content distribution system 102. In some embodiments, third-party systems may be given full access to distribution entries regarding one or more content creators of the content distribution system 102. In various embodiments, third-party systems are given access to some or all of the distribution entries of one or more content creators only after obtaining permission from the one or more content creators.

A module may be hardware or software. In some embodiments, the module may configure one or more processors to perform functions associated with the module. Although different modules are discussed herein, it will be appreciated that the content distribution system 102 may include any number of modules performing any or all functionality discussed herein.

In one example, the embedded code on a website of a particular content creator may provide a collection of crowd-sourced reviews of digital content created by the particular content creator. These crowd-sourced reviews may be stored on the website, official fan websites of the particular content creator, and/or the content distribution system 102.

Figure 3:
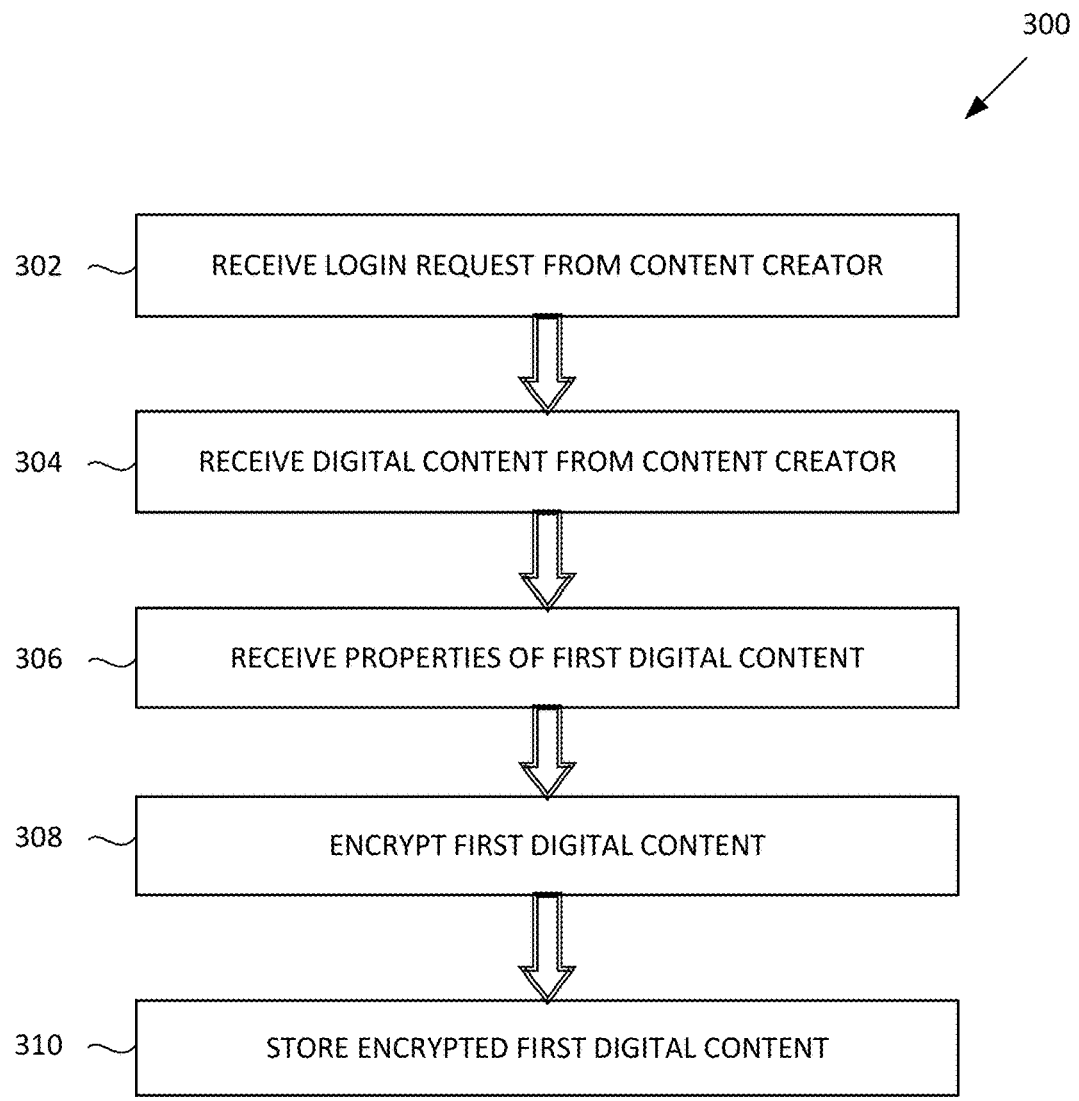
FIG. 3 depicts a flow chart of a method of uploading digital content according to some embodiments.

FIG. 3 depicts a flow chart 300 of a method of uploading digital content to the content distribution system 102 according to some embodiments. In step 302, the authentication module 206 receives a login request from a first content creator to gain access to the content distribution system 102. The content creator may be required to provide a user identifier and a password. In some embodiments, the login request may be in the form of biometric identification, such as a fingerprint, retinal scan, or facial recognition to gain access to the content distribution system 102.

If the content creator does not have an account with the content distribution system 102, the registration module 204 receives a request to create a user account. In some embodiments, only content creators may be given permission to send requests to encrypt and store digital content to the digital content datastore 220. Content creators may be authorized to search or request digital content, create reviews associated with digital content stored in the digital content datastore 220, and generate consumer content reports. The content consumer may be authorized to search or request digital content from the digital content datastore 220 as well as create reviews associated with digital content stored in the digital content datastore 220. In some embodiments, the content creator may receive a request from one or more third-party systems to release distribution entries associated with the content creator to the third-party systems.

In step 304, the content creator may interact with the user interface of the content distribution system 102 and send a request to the digital content datastore 220 to store the first digital content. It will be appreciated the digital content may include any type of digital media, including, but not limited to, pictures, text, video, sound, graphics, icons, interactive programming, or any combination of the above.

In step 306, the digital content datastore 220 receives the one or more digital content properties of the first digital content. The digital content properties may include the name of the digital content, a geographic location associated with the digital content, time digital was loaded into the content distribution system, length of time the digital content will be available to content consumers, when the digital content is available to the content consumer, subscription of content consumers that keywords, hashtags associated with the digital content, and the like. In some embodiments, digital content properties include whether distribution entries associated with the digital content may be accessible by other content creators or one or more third-party systems. Distribution entries associated with different digital content associated with the same content creators may have different accessibility permissions. For example, a particular content creator may allow one or more third-party systems to access distribution entries associated with one digital content, but not distribution entries associated with another digital content.

In step 308, the digital content datastore 220 sends a request to the encryption module 214 to encrypt the digital content before it can be stored in the digital content datastore 220. The encryption module 214 encrypts the digital content so that it can only be outputted in the content distribution system 102 or from a website that included the embedded code from the content distribution system 102. In some embodiments, the encryption module 214 generates an encryption key to encrypt the digital content before it is stored in the digital content datastore 220. In some embodiments, a random number is used to generate the encryption key changes over time. In various embodiments, a Data Encryption Standard (DES) encryption is used. In one embodiment, an Advanced Encryption Standard (AES) encryption is used to encrypt the digital content.

After the encryption module 214 encrypts the digital content, step 410 may proceed. In this step, the digital content datastore 220 stores the encrypted digital content into the digital content datastore 220. In some embodiments, the digital content properties are also stored in the digital content datastore 220.

Figure 4:
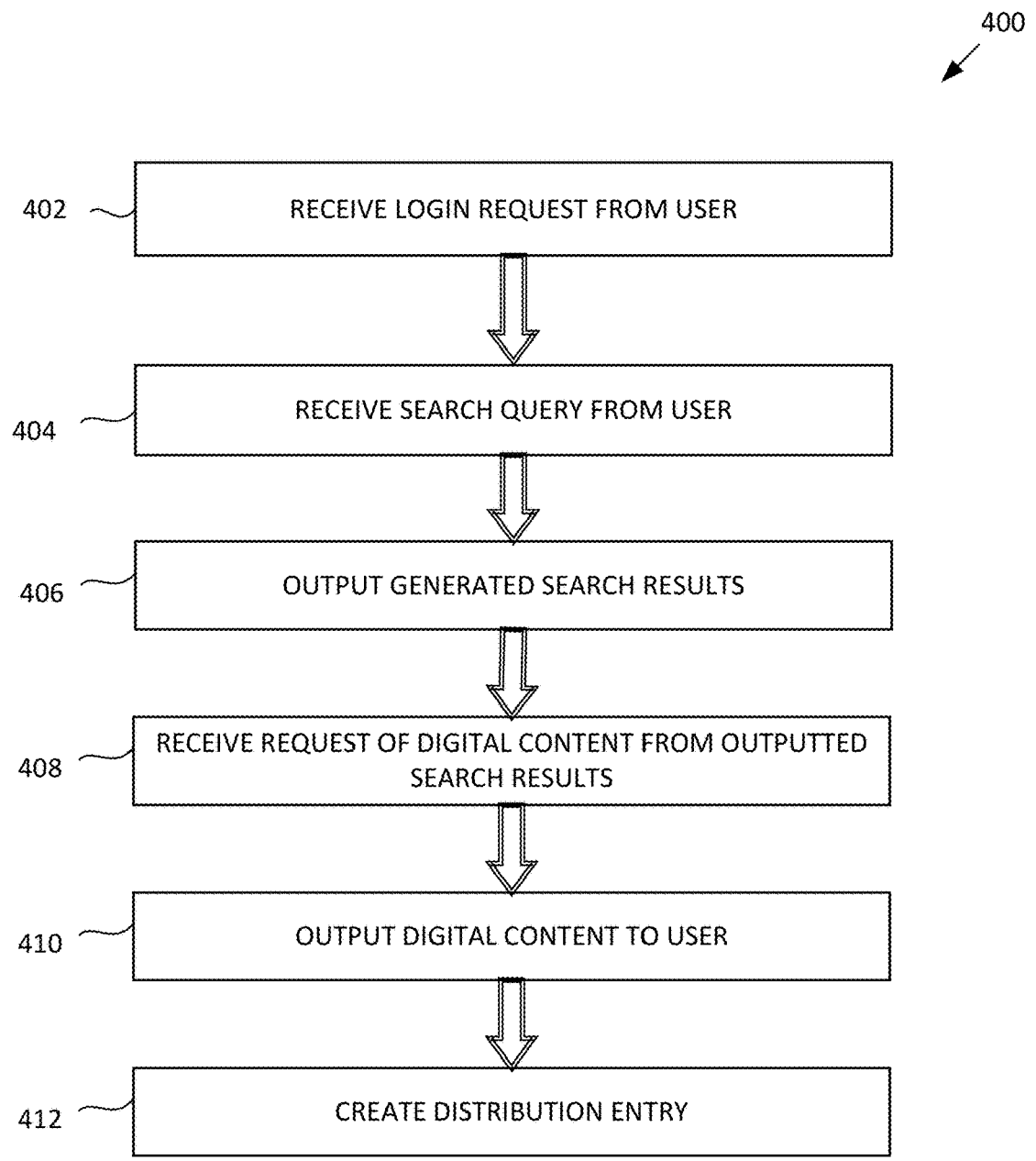
FIG. 4 depicts a flow chart of a method of retrieving of content consumer reports according to some embodiments.

FIG. 4 depicts a flow chart 400 of a method of retrieval of digital content from the content distribution system according to some embodiments. In various embodiments, a first user may attempt to access the creator's content from a third-party system 108 such as a web page or system that communicates with the content distribution system 102. There maybe any number of web pages on any number of servers that provide access to the creator's content on the content distribution system 102. The user may utilize a digital device to navigate to the third-party system using a browser or application. The third-party system 108 may provide an interface to log in or otherwise receiving information that will be shared with the content distribution system 102. The third-party system may, in some embodiments, display widgets, applications, or the like within windows that make any interaction that depends on communication with the content distribution system 102 appear as if the interaction is occurring with the third-party system 108 (e.g., interacting with the ecosystem of the owner or operator of the third-party system 108). For example, it map appear that the interaction, information, and content is provided through or enabled by a particular chain of coffee shops.

Access and consumption of the creator's content, however, even if through the third-party system 108, is controlled by the rules created and dictated by the content creator at the content distribution system 102. As such, the content creator creates a unified set of rules at the content distribution system 102 that is applied at the content distribution system 102 and/or through any number of third-party system(s) (e.g., each of the any number of third-party systems may be owned and/or operated by different, unrelated independent third-parties).

Further, in some embodiments, there may be any number of content creators. Different third-party systems may be restricted from accessing content of one or more content creators while allowing access to content of other content creators. For example, a first third-party system 108 may enter into a contract with content creators A, B, and C. The first third-party system may not enter into a contract with content creator D. Content creators A, B, and C may create rules controlled at least by the content distribution system 102 that dictate that when a user request for A, B, or C's particular content is received from the first third-party system, then the content distribution system 102 and/or the first third-party system may proceed with other rules (e.g., login requirements or any other kind of requirements before providing the requester access to that content creator's content). Content creator D may create a rule that either denies access to user requests for their content coming from the first third-party system 108 or does not create a rule allowing access based on user requests for content creator D's content coming from the first third-party system 108. As a result, the request for content creator D's content from the first third-party system may be denied.

In various embodiments, a particular consumer may send a general request from a particular third-party system for content. The request may identify a type of content. The third-party system may be a member of a particular domain. The request may identify particular consumer (e.g., with a consumer identifier) as well as a domain identifier of the particular domain. The content distribution system 102 may identify the content of different content creators that satisfy the type of content requested (e.g., through each individual content creator's category labels of their content). Any number of content creator's rules may include a list of acceptable domain identifiers. If the domain identifier associated with the request is a member of the list of domain identifiers of a content creator's rules, the content distribution system 102 may provide the content that meets the requested type of content if the other rules for that particular content creator is met. As such, the content distribution system 102 may provide content from any number of content creators in response to the request.

For example, content creators may create content for anime while other content creators may create content for alternative rock music. Each content creator may create an account with the content distribution system 102 and store their content on the content distribution system 102. The content creators that create anime content may label their content as anime while the content creators that create music may label their content as alternative rock music. If a particular consumer navigates to an alternative rock website or domain and provides a request for content, the alternative rock website or domain may provide the request to the content distribution system 102. The request may include the consumers identification information (e.g., consumer identifier) as well as an indication of the alternative rock domain. Based on the domain, the content distribution system 102 may determine which creator rules permit content access to that particular domain. The content distribution system 102 may then determine if the requesting consumer meets the other requirements of each set of rules for each content creator that created alternative rock music stored on the content description system 102. If requirements are met, the content distribution system 102 may provide content from any number of content creators to the requesting consumer. Similarly, if request is received from an anime website, the content distribution system 102 may determine which creator rules permit content access to that particular domain.

The content distribution system 102 may then determine if the requesting consumer meets the other requirements of each set of rules for each content creator that created anime stored on the content description system 102. In this way, different content creators can store their content in a unified place and create rules to dictate control of their content in any way they wish.

In step 402, the authentication module 206 receives a login request from a first user to gain access to the content distribution system 102. The first user may be a content consumer, a content creator, or a representative of a third-party system. The first user may be required to provide a user identifier and a password. In some embodiments, the login request may be in the form of biometric identification, such as a fingerprint, retinal scan, or facial recognition to gain access to the content distribution system 102. The authentication module 206 authenticates the first user's login request.

In various embodiments, the authentication module 206 may receive login information and log in users from any digital devices and through any third-party systems. The authentication module 206 may, for example, provide a unified login for all users, content creators, content consumers and the like. Once the user, content creator, or content consumer successfully logs in through the authentication module 206, the content distribution system 102 may receive a request to search or otherwise access a content creator's content. Based on the request, the access control module 210 may then confirm that the user that successfully logged into the content distribution system 102 has rights to search or otherwise access the content creator's content (e.g., by retrieving and following the content creator's rules for access discussed herein).

In another example, if a user successfully logs into a particular third-party system 108, the third-party system 108 may provide the login information to the authentication module 206 for confirmation or separate log in. In this way, a user may log into both the third-party system 108 and the content distribution system 102 simultaneously (e.g., using the single login and the same log in information). Information identifying the user, the login, passwords, and the like may be utilized by the access control module 210 to determine if the user has access rights to search results or content for any content creator based on each content creator's rules.

In step 404, the search module 208 receives a request to search for digital content. The access control module 210 may confirm that the requester has met any rules requirements established or accepted by the content creator which governs access or searches of their content. Assuming the requester met requirements, the search module 208 may create a search query based on one or more search criteria. The result of the search query is a search result that may be based, at least in part, on information provided in the search query. The search module 208 searches the digital content datastore 220 for the requested digital content. The search module 208 filter and organize the search results according to one or more filter criteria, including the digital content properties. In some embodiments, the digital content properties may include content, length of digital content, keywords, a geographic location associated with the digital content, and the name of the content creator associated with the digital content.

In step 406, the search module 208 provides the results of the search query in the form of a map, a list, or in some other electronic forms. The user may interact (e.g., click) with one or more elements in the search results.

In response to the user interacting with the one or more elements of the search results, step 408 may occur, the search module 208 may send a request to the digital content datastore 220 for a requested digital content. The digital content datastore 220 may send a request to the access control module 210 to determine whether or not the user has permission to access the requested digital content—the determination based at least on one distribution property (e.g., a content creator's rules). Distribution properties may include user groups that have access to a particular digital content, when the particular digital content will be made available, and for how long. In various embodiments, the content creator determines that only users who have a premium membership may access the particular digital content.

It will be appreciated that the access control module 210 may confirm rights of the user based on the request to search for the content creator's content, a request to retrieve the content creator's content, or both. In some embodiments, the request may be for content created by more than one content creator. In this example, the access control module 210 may confirm rights of the user based on the request to search and/or access each different content creator's content (by retrieving and applying rules for each content creator whose content may be affected, searched or downloads). If the requester meets the requirements of one or more content creator's rules, then the requester may receive search results/content related to those particular content creators. If the requester does not meet the requirements of one or more content creator rules, then the requester may not receive search results/content related to those content creators.

When access or search results are denied, the access control module 210 may optionally (e.g., may or may not) provide notice of what is denied, why content/results were denied, and/or steps that may be taken for access. The notice may be provided to the requester through the requester's digital device, third-party system 108, and/or the like. Similarly, information related to what was consumed, requests received, requests denied, and the like related to a particular content creator may be stored by the particular content creator in real time.

If the access control module 210 determines that the user has permission to access the requested digital content, then step 410 may proceed. If the access control module 210 determines that the user does not have permission to access the requested digital content, the user interface may output a notification which informs the user that the user lacks a subscription, and output a subscription interface that allows the user to subscribe to the type of subscription required to allow the user to access the requested digital content. In various embodiments, the access control module 210 may only grant access to users requesting certain digital content if the users are in a particular geographic location. If the access control module 210 determines that the user does have permission to access the requested digital content, then the digital content datastore 220 may output the requested digital content to the user via the communication module 202.

In step 412, the content distribution module 212 creates a distribution entry for the requested digital content. Each distribution entry may include distribution entry properties. Distribution entry properties and/or the function of the content distribution module 212 may be separately controlled by each content creator. Entries may be created by the content distribution module 212 and stored in that particular content creator's storage in real time.

In some embodiments, distribution entry property includes content consumer identification, content creator identification, duration of time the content consumer consumed the digital content, and age and other demographic information of the content consumer. In various embodiments, the distribution entry properties include a domain identifier; the domain identifier identifies the website domain the user utilized to access the requested digital content. For example, the content distribution system 102 or a widget with similar coding may be embedded into an official fan web page of a particular content creator. When a user accesses another digital content from the content distribution system 102 embedded into the official fan web page, the distribution entry may include the domain of the official fan web page, this information may be used in content consumer reports to determine the popularity of web sites, web pages, or applications. In some embodiments, the distribution entry properties include digital content properties. The distribution entry may be stored in the distribution datastore 222.

Figure 5:
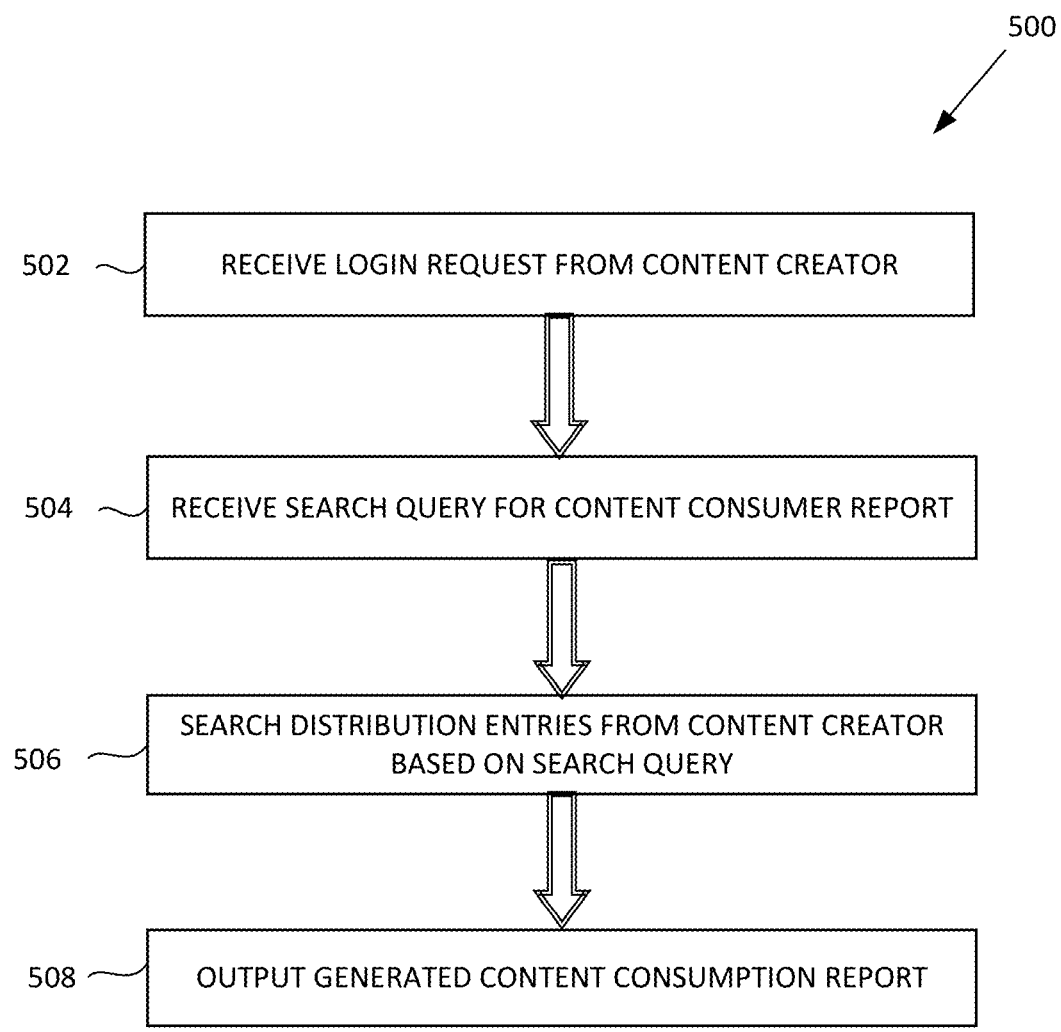
FIG. 5 depicts a flow chart of a method of retrieving a content consumer report according to some embodiments.

FIG. 5 depicts a method 500 of a content creator retrieving a content consumer report according to some embodiments. In step 502, the authentication module 206 receives a login request from a content creator to gain access to the content distribution system 102. The first content creator may be required to provide a user identifier and a password. In some embodiments, the login request may be in the form of biometric identification, such as a fingerprint, retinal scan, or facial recognition to gain access to the content distribution system 102.

In step 504, the search module 208 receives a search query for a content consumer report to create a search query based on one or more search criteria. In various embodiments, the content distribution system 102 stores all tracked access, logins, content consumer identifiers, timestamps of consumption, third-party systems 108 that provided requests and/or received content, and the like. The content distribution system 102 may store the information related to or that affects the content creator's content within a storage (e.g., digital content datastore 220 and/or content creator's local digital device) that is dedicated to the particular content creator. In some embodiments, the digital content datastore 220 may store the information within dedicated sections, portions, or memory for each content creator (e.g., each content creator may have its own dedicated, private section of storage for content and/or information stored by the content distribution system 102 that affects that particular content creator). If a search request affects two or more content creator, the search request, including the person requesting, time, date, what was requested, and the like, may be stored in each of the affected two or more content creators.

The search criteria include distribution entry properties, which includes content consumer identification, content creator identification, duration of time the content consumer consumed the digital content, age, and other demographic information of the content consumer. In various embodiments, the distribution entry properties include a domain identifier. A search result may be based, at least in part, on information provided in the search query.

In step 506, the search module 208 receives a request to the content distribution module 212 to generate the requested content consumer report. The content distribution module 212 searches distribution entries in the distribution datastore 222 to generate the requested content consumer report. In some embodiments, the content distribution module 212 will only search distribution entries associated with digital content created by the content creator. In some embodiments, distribution entries associated with digital content created by other content creators of the content distribution system 102 may not be accessible by the content creator. In various embodiments, distribution entries associated with one or more content creators may be made public to all content creators authorized by the authentication module 206.

In step 508, the content distribution module 212 outputs the generated content consumer report in the form of a spreadsheet, such as an example content consumer report 800 of FIG. 8. In various embodiments, the content distribution module 212 displays the output of the generated content consumer report in the form of a map, of a list, or in other electronic forms. The content creator may interact with one or more distribution entries of the content consumer report to provide further details of the distribution entries. For example, the content creator may interact with a first distribution entry to view a profile page of a first content consumer. The first distribution entry being generated when the first content consumer accessed the first digital content. In some embodiments, the content distribution module 212 provides a real-time content consumer report in the form of a map, such as a map 900 of FIG. 9, or in other forms, to give a particular content creator a real-time view of content consumers accessing digital content created by the particular content creator.

Figure 6:
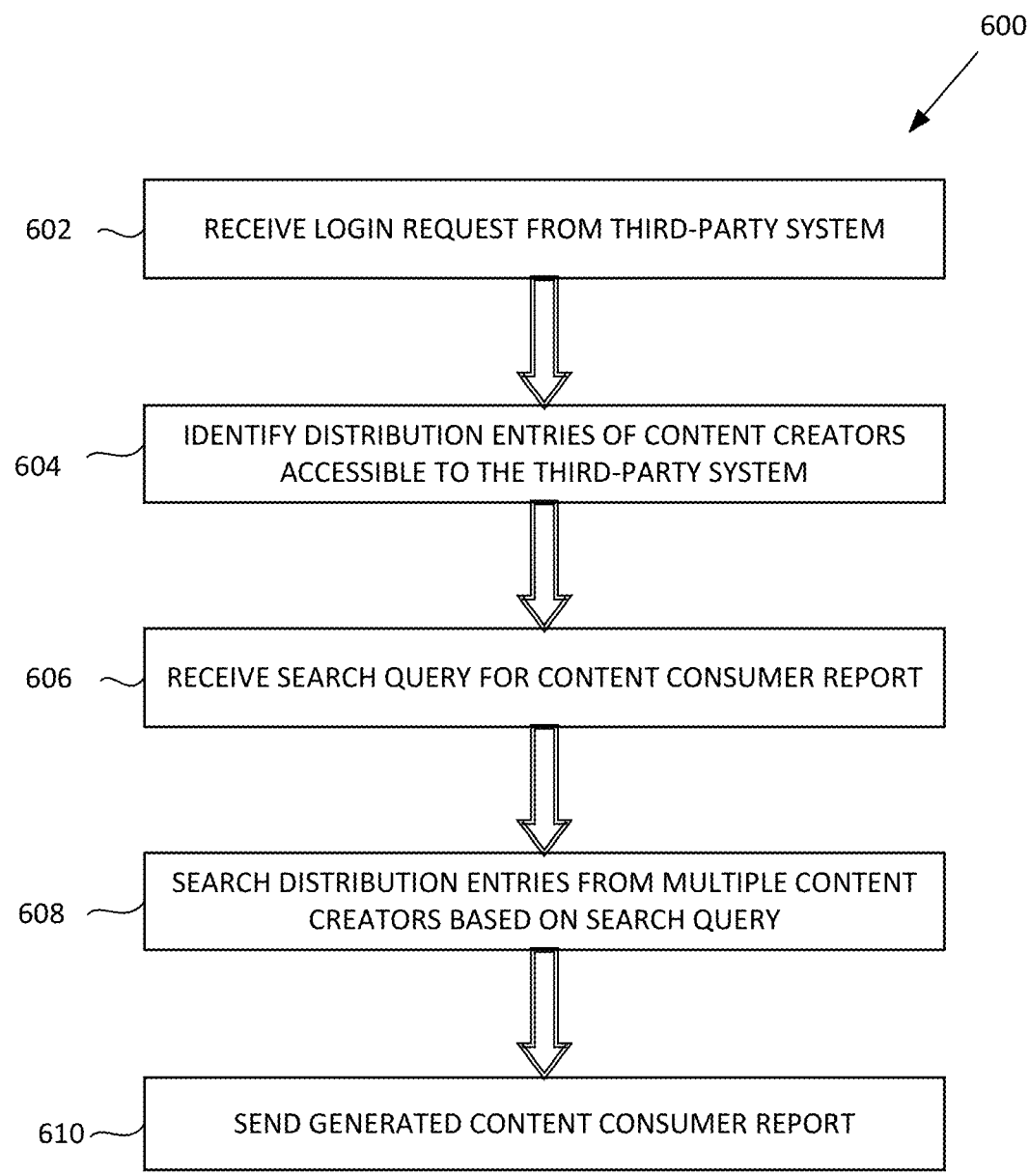
FIG. 6 depicts a flow chart of retrieval of content consumer report over multiple content creators according to some embodiments.

FIG. 6 depicts a method 600 of a third-party system retrieving a content consumer report over multiple content creators according to some embodiments. In step 602, the authentication module 206 receives a login request from a third-party system, such as the first third-party system 108A, to gain access to the content distribution system 102.

In step 604, the access control module 210 identifies the distribution entries that a particular third-party system has access to. Third-party systems may have access to digital content, reviews associated with digital content, and distribution entries associated with digital content. In an example, a first content creator and a second content creator of the content distribution system 102 is required to give permission to the distribution datastore 222 and make their distribution entries searchable by various third-party systems.

Each content creator may determine accessibility permissions of distribution entries associated with different digital content. For example, a particular content creator may allow one or more third-party systems to access distribution entries associated with one digital content, but not distribution entries associated with another digital content.

In step 606, the search module 208 receives a search query for a content consumer report to create a search query based on one or more search criteria. The search criteria include the distribution properties of the digital content, name of the content creator, demographic information of the content consumer. In various embodiments, the distribution entry properties include a domain identifier. For example, a marketing team for a coffee house may send a request to the search module 208 for a report of a content creator of the content distribution system 102, which is most popular with people between the ages of 25-34 with a household income greater than $50,000.

In step 608, the search module 208 searches distribution entries in the distribution datastore 222 to generate the requested content consumer report. In some embodiments, the search module 208 will only search distribution entries associated with content creators who have given permission to the third-party system to make their distribution entries searchable. In various embodiments, content creators of the content distribution system 102 do not need to give permission to the third-party system to make their distribution entries searchable.

In step 610, the content distribution module 212 outputs the generated content consumer report in the form of a spreadsheet, such as an example content consumer report. In various embodiments, the content distribution module 212 displays the output of the generated content consumer report in the form of a map, of a list, or in other electronic forms. The content creator may interact with one or more distribution entries of the content consumer report to provide further details of the distribution entries.

FIG. 7 depicts a method 700 for identifying distribution entries that are accessible to a third-party system according to some embodiments. In step 702, the content distribution system 102 receives, from the first third-party system 108A, a search request. In one example, the first third-party system 108A may be a marketing firm wanting to search for an internet video creator with a target audience of women age 18-21. The content distribution system 102 may receive the search parameters and determine the subset of distribution entries stored in the content distribution system 102 to search for content creators that are popular with a particular demographic, such as women between the ages of 18 and 21. In some embodiments, the content distribution system 102 may need to send a request to the first content creation system 106A and the second content creation system 106N to allow the first third-party system 108A to access some or all of the distribution entries associated with the first content creation system 106A.

In step 704, the content distribution system 102 may send a request to the first content creation system 106A to allow the first third-party system 108A permission to access some or all of the distribution entries associated with the first content creation system 106A. When a content creator uploads digital content to the content distribution system 102, the content creator may determine properties of the digital content, such as specifying one or more third-party systems that may have access to distribution entries associated with digital content uploaded by the content creator. In some embodiments, the content creator may specify that all third-party systems may have access to distribution entries associated with digital content uploaded by the content creator. In various embodiments, the content creator may specify that distribution entries associated with one digital content may be accessible by one third-party system, while distribution entries associated with different digital content may be accessible by a different third-party system.

If the first content creation system 106A gives the first third-party system 108A access to some or all of the distribution entries associated with digital content uploaded by the first third-party system 108A, then method 700 proceeds to step 706, the content distribution system 102 may update the distribution entries associated with the first content creation system 106A to allow the first third-party system 108A access to the distribution entries associated with the first content creation system 106A.

Similar to step 704, in step 708, the content distribution system 102 may send a request to the second content creation system 106N to allow the first third-party system 108A permission to access some or all of the distribution entries associated with the second content creation system 106N.

If the first content creation system 106A gives the first third-party system 108A access to some or all of the distribution entries associated with digital content uploaded by the first third-party system 108A, then method 700 proceeds to step 710, the content distribution system 102 may update the distribution entries associated with the second content creation system 106N to allow the first third-party system 108A access to the distribution entries associated with the second content creation system 106N.

In step 712, the search module 208 of the content distribution system 102 may perform a searching using the search criteria provided in step 702 on the subset of distribution entries, which gives access to the first third-party system 108A for searching purposes.

Figure 10:
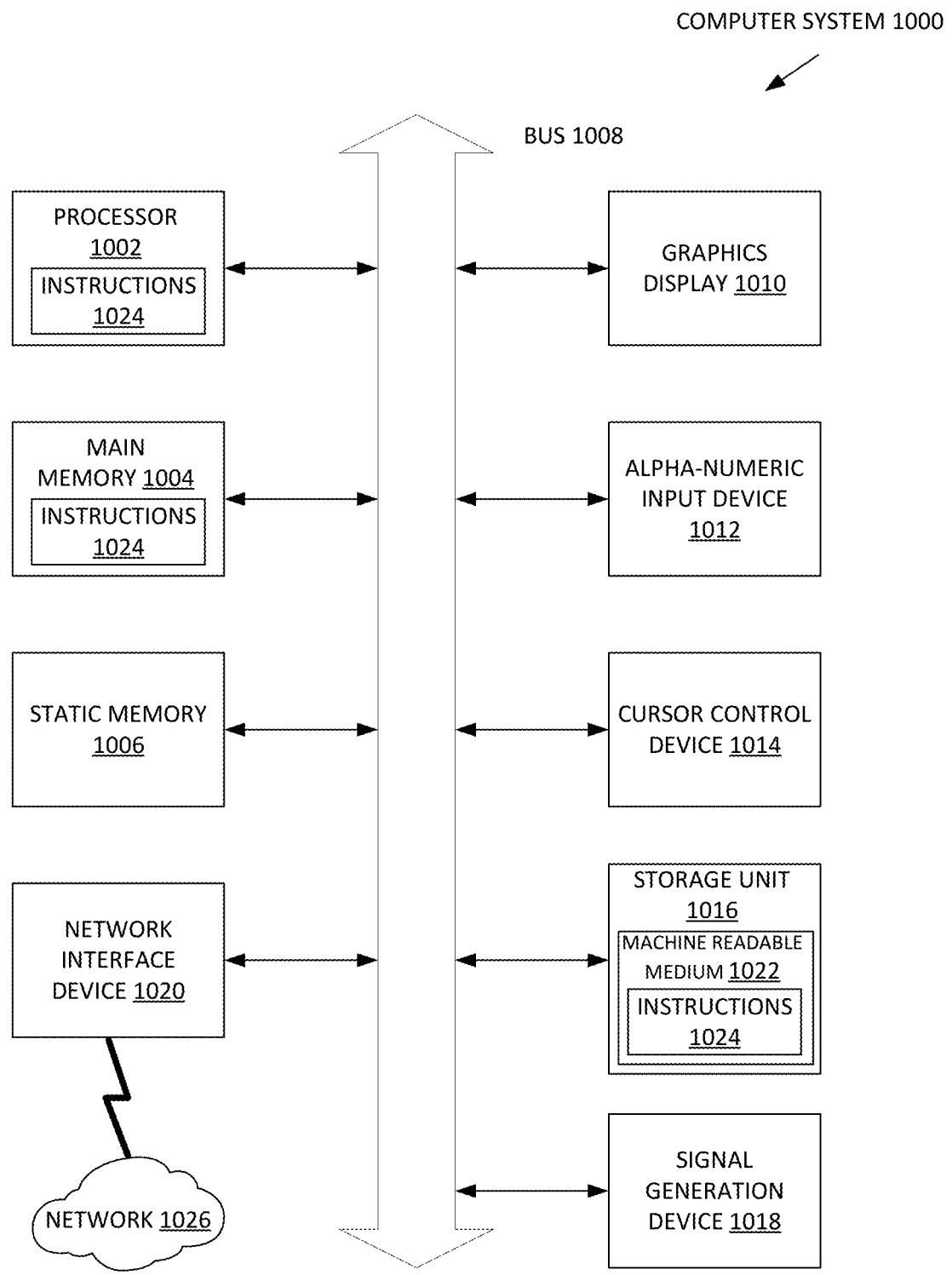
FIG. 10 depicts a block diagram of an example computing device according to some embodiments.

FIG. 10 depicts a block diagram of an example computing device 1000 according to some embodiments. Any of the first consumer system 104A, the second consumer system 104N, the content distribution system 102, the first content creation system 106A, the second content creation system 106N, the first third-party system 108A, and the second third-party system 108N comprise an instance of a computing device 1000. In some embodiments, the computing device 1000 may be a digital device. Computing device 1000 includes processor 1002, RAM 2404, communication interface 1006, input/output device 1008, storage 1010, and a system bus 1012 that couples various system components, including storage 1010 to processor 1002.

System bus 1012 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 1000 typically includes a variety of computer system readable media. Such media may be any available media that is accessible by the computing device 1000 and it includes both volatile and non-volatile media, removable and non-removable media.

In some embodiments, processor 1002 is configured to execute executable instructions (e.g., programs). In some embodiments, the processor 1002 comprises circuitry or any processor capable of processing the executable instructions.

In some embodiments, RAM 1004 stores data. In various embodiments, working data is stored within RAM 1004. The data within RAM 1004 may be cleared or ultimately transferred to storage 1010.

In some embodiments, communication interface 1006 is coupled to a network via communication interface 1006. Such communication can occur via Input/Output (I/O) device 1008. Still yet, the computing device 1000 may communicate with one or more networks such as a local area network (LAN), a general wide area network (WAN), and/or a public network (e.g., the Internet).

In some embodiments, I/O device 1008 is any device that inputs data (e.g., mouse, keyboard, stylus) or outputs data (e.g., speaker, display, virtual reality headset).

In some embodiments, storage 1010 can include computer system readable media in the form of volatile memory, such as read-only memory (ROM) and/or cache memory. Storage 1010 may further include other removable/non-removable, volatile/non-volatile computer system storage media. By way of example only, storage 1010 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CDROM, DVD-ROM or other optical media can be provided. In such instances, each can be connected to system bus 1012 by one or more data media interfaces. As will be further depicted and described below, storage 1010 may include at least one program product having a set (e.g., at least one) of program modules that are configured to carry out the functions of embodiments. In some embodiments, RAM 1004 is found within storage 1010.

Program/utility, having a set (at least one) of program modules may be stored in storage 1010 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments, as described herein. A module may be hardware (e.g., ASIC, circuitry, and/or the like), software, or a combination of both.

It should be understood that although not shown, other hardware and/or software components could be used in conjunction with the computing device 1000. Examples include, but are not limited to: microcode, device drivers, redundant processing units, and external disk drive arrays, RAID systems, tape drives, and data archival storage systems, etc.

Exemplary embodiments are described herein in detail with reference to the accompanying drawings. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of one or more embodiments may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband/or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Aspects of some of the embodiments are described herein with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

It may be apparent to those skilled in the art that various modifications may be made and other embodiments may be used without departing from the broader scope of the discussion herein. Therefore, these and other variations upon the example embodiments are intended to be covered by the disclosure herein.

The invention claimed is:

1. A method comprising:
   receiving, by a content distribution system, a first request to store first creator content generated by a first content creator of a plurality of content creators, the first request to store the first creator content including a first content creator identifier, and one or more first categorical identifiers associated with the first content creator content;
   storing, by the content distribution system, the first creator content within a data store;
   receiving, by the content distribution system, first rules by the first content creator that govern access to the first creator content, the first rules including a requirement that for any particular consumer to have access to the first creator content, that particular consumer must be a member of a first content creator group, must have paid a fee to be a member of the first content creator group, and be within a first particular geographic area, the first rules further allowing access to the first creator content to request for content provided by a first subset of third-party systems if all the other first rules are met by a requester, the first subset of third-party systems be independent of and remote from each other;
   receiving, by the content distribution system, a second request to store second creator content generated by a second content creator of the plurality of content creators, the second request to store second creator content including a second content creator identifier, and one or more second categorical identifiers associated with the second content creator content;
   storing, by the content distribution system, the second creator content within the data store;
   receiving, by the content distribution system, second rules by the second content creator that govern access to the second creator content, the second rules including a requirement that for any particular consumer to have access to the second creator content, that particular consumer must be a member of a second content creator group, and be within a second particular geographic area, the second rules not including a payment requirement, the second rules further allowing access to the second creator content to request for content provided by a second subset of third-party systems if all the other second rules are met by the requester, the second subset of third-party systems be independent of and remote from each other, the first subset of third-party systems and the second subset of third-party systems being different from each other;
   receiving, by the content distribution system, a first identifier from a first third-party system from a first user and a first request for first creator content from the first user;
   confirming, by the content distribution system, that the first third-party system is a member of the first subset of third-party systems;
   if the first third-party system is not a member of the first subset of third-party systems, sending, by the content distribution system, a denial of the first request;
   if the first third-party system is a member of the first subset of third-party systems, determining, by the content distribution system, from the first request if the first user meets requirements of the first rules including that the first user, based on the first identifier, is a member of the first content creator group, paid the fee to be a member of the first content creator group, and is within the first particular geographic area;
   if the first user meets the requirements of the first rules, providing, by the content distribution system, the first creator content requested by the first request to the first user through the first third-party system;
   receiving, by the content distribution system, a second identifier from a second third-party system from a second user and a second request for second creator content from the second user;
   confirming, by the content distribution system, that the second third-party system is a member of the second subset of third-party systems;
   if the second third-party system is not a member of the second subset of third-party systems, sending, by the content distribution system, a denial of the second request;
   if the second third-party system is a member of the second subset of third-party systems, determining, by the content distribution system, from the second request if the second user meets requirements of the second rules including that second user, based on the second identifier, is a member of the second content creator group and is within the second particular geographic area; and
   if the second user meets the requirements of the first rules, providing, by the content distribution system, the second creator content requested by the second request to the second user through the second third-party system.

2. The method of claim 1, wherein the first rules allowing access to the first creator content to requests for content provided by the first subset of third-party systems comprises the first rules allowing access to the first creator content to requests for content provided by a first domain, and wherein confirming by the content distribution system that the first third-party system is a member of the first subset of third-party systems comprises confirming that the first third-party system is a member of the first domain and if the first third-party system is not a member of the first domain, sending, by the content distribution system to the first third-party system, a denial of the first request.

3. The method of claim 1, wherein the first particular geographic area is a country.

4. The method of claim 1, wherein the first particular geographic area is a venue.

5. The method of claim 1, wherein the first rules further require a time frame when the first user must provide the first request to obtain access for the first creator content.

6. The method of claim 1, wherein the first rules further comprise a particular requirement that the first user must provide the first request from a particular venue during a particular time frame for access to a subset of first creator content, the subset of the first creator content otherwise not being available to other consumers that cannot meet the particular requirement.

7. The method of claim 1, further comprising:
   receiving, by the content distribution system, the second identifier from a third third-party system from the second user and a third request for first creator content from the second user;
   confirming, by the content distribution system, that the third third-party system is a member of the first subset of third-party systems;
   if the third third-party system is not a member of the first subset of third-party systems, sending, by the content distribution system, a denial of the third request;

if the third third-party system is a member of the first subset of third-party systems, determining, by the content distribution system, from the third request if the second user meets requirements of the first rules including that the third user, based on the third identifier, is a member of the first content creator group, paid the fee to be a member of the first content creator group, and is within the first particular geographic area; and if the second user meets the requirements of the first rules, providing, by the content distribution system, the first creator content requested by the third request to the second user through the third third-party system.

8. The method of claim 1, further comprising:

receiving, by the content distribution system, the second identifier from a third third-party system from the second user and a third request for general content from the second user;

confirming, by the content distribution system, that the third third-party system is a member of the first subset of third-party systems and the second subset of third-party systems;

determining that the second user meets the requirements of the second rules and not the first rules; and providing access to the second creator content.

9. The method of claim 1, further comprising:

receiving, by the content distribution system, the second identifier from a third third-party system from the second user and a third request for general content from the second user;

confirming, by the content distribution system, that the third third-party system is a member of the first subset of third-party systems and the second subset of third-party systems;

determining that the second user meets the requirements of the second rules and the first rules; and providing access to the first creator content and the second creator content.

10. The method of claim 1, wherein determining if the first user is within the first particular geographic area comprises determining if the first third-party system is within the first particular geographic area, based, at least in part, on a first third-party system identifier.

11. The method of claim 1, wherein determining if the first user is within the first particular geographic area comprises determining if the first third-party system is within the first particular geographic area, based, at least in part, on GPS information from a digital device of the first user.

12. A non-transitory computer readable medium comprising executable instructions, the executable instructions being executable by a processor for performing a method, the method comprising:

receiving, by a content distribution system, a first request to store first creator content generated by a first content creator of a plurality of content creators, the first request to store the first creator content including a first content creator identifier, and one or more first categorical identifiers associated with the first content creator content;

storing, by the content distribution system, the first creator content within a data store;

receiving, by the content distribution system, first rules by the first content creator that govern access to the first creator content, the first rules including a requirement that for any particular consumer to have access to the first creator content, that particular consumer must be a member of a first content creator group, must have paid a fee to be a member of the first content creator group, and be within a first particular geographic area, the first rules further allowing access to the first creator content to request for content provided by a first subset of third-party systems if all the other first rules are met by a requester, the first subset of third-party systems be independent of and remote from each other;

receiving, by the content distribution system, a second request to store second creator content generated by a second content creator of the plurality of content creators, the second request to store second creator content including a second content creator identifier, and one or more second categorical identifiers associated with the second content creator content;

storing, by the content distribution system, the second creator content within the data store;

receiving, by the content distribution system, second rules by the second content creator that govern access to the second creator content, the second rules including a requirement that for any particular consumer to have access to the second creator content, that particular consumer must be a member of a second content creator group, and be within a second particular geographic area, the second rules not including a payment requirement, the second rules further allowing access to the second creator content to request for content provided by a second subset of third-party systems if all the other second rules are met by the requester, the second subset of third-party systems be independent of and remote from each other, the first subset of third-party systems and the second subset of third-party systems being different from each other;

receiving, by the content distribution system, a first identifier from a first third-party system from a first user and a first request for first creator content from the first user;

confirming, by the content distribution system, that the first third-party system is a member of the first subset of third-party systems; if the first third-party system is not a member of the first subset of third-party systems, sending, by the content distribution system, a denial of the first request;

if the first third-party system is a member of the first subset of third-party systems, determining, by the content distribution system, from the first request if the first user meets requirements of the first rules including that the first user, based on the first identifier, is a member of the first content creator group, paid the fee to be a member of the first content creator group, and is within the first particular geographic area;

if the first user meets the requirements of the first rules, providing, by the content distribution system, the first creator content requested by the first request to the first user through the first third-party system;

receiving, by the content distribution system, a second identifier from a second third-party system from a second user and a second request for second creator content from the second user;

confirming, by the content distribution system, that the second third-party system is a member of the second subset of third-party systems;

if the second third-party system is not a member of the second subset of third-party systems, sending, by the content distribution system, a denial of the second request;

if the second third-party system is a member of the second subset of third-party systems, determining, by the content distribution system, from the second request if the second user meets requirements of the second rules including that second user, based on the second identifier, is a member of the second content creator group and is within the second particular geographic area; and if the second user meets the requirements of the first rules, providing, by the content distribution system, the second creator content requested by the second request to the second user through the second third-party system.

13. The non-transitory computer readable medium of claim 12, wherein the first rules allowing access to the first creator content to requests for content provided by the first subset of third-party systems comprises the first rules allowing access to the first creator content to requests for content provided by a first domain, and wherein confirming by the content distribution system that the first third-party system is a member of the first subset of third-party systems comprises confirming that the first third-party system is a member of the first domain and if the first third-party system is not a member of the first domain, sending, by the content distribution system to the first third-party system, a denial of the first request.

14. The non-transitory computer readable medium of claim 12, wherein the first particular geographic area is a country.

15. The non-transitory computer readable medium of claim 12, wherein the first particular geographic area is a venue.

16. The non-transitory computer readable medium of claim 12, wherein the first rules further require a time frame when the first user must provide the first request to obtain access for the first creator content.

17. The non-transitory computer readable medium of claim 12, wherein the first rules further comprise a particular requirement that the first user must provide the first request from a particular venue during a particular time frame for access to a subset of first creator content, the subset of the first creator content otherwise not being available to other consumers that cannot meet the particular requirement.

18. The non-transitory computer readable medium of claim 12, the method further comprising:
   receiving, by the content distribution system, the second identifier from a third third-party system from the second user and a third request for first creator content from the second user;
   confirming, by the content distribution system, that the third third-party system is a member of the first subset of third-party systems;
   if the third third-party system is not a member of the first subset of third-party systems, sending, by the content distribution system, a denial of the third request;
   if the third third-party system is a member of the first subset of third-party systems, determining, by the content distribution system, from the third request if the second user meets requirements of the first rules including that the third user, based on the third identifier, is a member of the first content creator group, paid the fee to be a member of the first content creator group, and is within the first particular geographic area; and
   if the second user meets the requirements of the first rules, providing, by the content distribution system, the first creator content requested by the third request to the second user through the third third-party system.

19. The non-transitory computer readable medium of claim 12, the method further comprising:
   receiving, by the content distribution system, the second identifier from a third third-party system from the second user and a third request for general content from the second user;
   confirming, by the content distribution system, that the third third-party system is a member of the first subset of third-party systems and the second subset of third-party systems;
   determining that the second user meets the requirements of the second rules and not the first rules; and
   providing access to the second creator content.

20. The non-transitory computer readable medium of claim 12, the method further comprising:
   receiving, by the content distribution system, the second identifier from a third third-party system from the second user and a third request for general content from the second user;
   confirming, by the content distribution system, that the third third-party system is a member of the first subset of third-party systems and the second subset of third-party systems;
   determining that the second user meets the requirements of the second rules and the first rules; and
   providing access to the first creator content and the second creator content.

21. The non-transitory computer readable medium of claim 12, wherein determining if the first user is within the first particular geographic area comprises determining if the first third-party system is within the first particular geographic area, based, at least in part, on a first third-party system identifier.

22. The non-transitory computer readable medium of claim 12, wherein determining if the first user is within the first particular geographic area comprises determining if the first third-party system is within the first particular geographic area, based, at least in part, on GPS information from a digital device of the first user.

23. A system comprising:
   one or more processors; and
   memory, the memory including instructions to configure the one or more processors to:
      receive a first request to store first creator content generated by a first content creator of a plurality of content creators, the first request to store the first creator content including a first content creator identifier, and one or more first categorical identifiers associated with the first content creator content;
      store the first creator content within a data store;
      receive first rules by the first content creator that govern access to the first creator content, the first rules including a requirement that for any particular consumer to have access to the first creator content, that particular consumer must be a member of a first content creator group, must have paid a fee to be a member of the first content creator group, and be within a first particular geographic area, the first rules further allowing access to the first creator content to request for content provided by a first subset of third-party systems if all the other first rules are met by a requester, the first subset of third-party systems be independent of and remote from each other;
      receive a second request to store second creator content generated by a second content creator of the plurality of content creators, the second request to store second creator content including a second content creator identifier, and one or more second categorical identifiers associated with the second content creator content; store the second creator content within the data store;

receive second rules by the second content creator that govern access to the second creator content, the second rules including a requirement that for any particular consumer to have access to the second creator content, that particular consumer must be a member of a second content creator group, and be within a second particular geographic area, the second rules not including a payment requirement, the second rules further allowing access to the second creator content to request for content provided by a second subset of third-party systems if all the other second rules are met by the requester, the second subset of third-party systems be independent of and remote from each other, the first subset of third-party systems and the second subset of third-party systems being different from each other;

receive a first identifier from a first third-party system from a first user and a first request for first creator content from the first user;

confirm that the first third-party system is a member of the first subset of third-party systems;

if the first third-party system is not a member of the first subset of third-party systems, send a denial of the first request;

if the first third-party system is a member of the first subset of third-party systems, determine from the first request if the first user meets requirements of the first rules including that the first user, based on the first identifier, is a member of the first content creator group, paid the fee to be a member of the first content creator group, and is within the first particular geographic area;

if the first user meets the requirements of the first rules, provide the first creator content requested by the first request to the first user through the first third-party system;

receive a second identifier from a second third-party system from a second user and a second request for second creator content from the second user;

confirm that the second third-party system is a member of the second subset of third-party systems;

if the second third-party system is not a member of the second subset of third-party systems, send a denial of the second request;

if the second third-party system is a member of the second subset of third-party systems, determine from the second request if the second user meets requirements of the second rules including that second user, based on the second identifier, is a member of the second content creator group and is within the second particular geographic area; and if the second user meets the requirements of the first rules, provide the second creator content requested by the second request to the second user through the second third-party system.

* * * * *